United States Patent
Zimmerman

(10) Patent No.: US 10,904,621 B2
(45) Date of Patent: Jan. 26, 2021

(54) METHODS AND APPARATUS TO MONITOR MEDIA PRESENTATIONS

(71) Applicant: The Nielsen Company (US), LLC, New York, NY (US)

(72) Inventor: Mark C. Zimmerman, Arlington Heights, IL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 16/355,272

(22) Filed: Mar. 15, 2019

(65) Prior Publication Data

US 2019/0215567 A1    Jul. 11, 2019

Related U.S. Application Data

(63) Continuation of application No. 15/299,156, filed on Oct. 20, 2016, now Pat. No. 10,356,475, which is a
(Continued)

(51) Int. Cl.
*H04N 21/442*      (2011.01)
*H04N 21/466*      (2011.01)
(Continued)

(52) U.S. Cl.
CPC ..... *H04N 21/4667* (2013.01); *G06Q 30/0241* (2013.01); *H04N 21/25883* (2013.01);
(Continued)

(58) Field of Classification Search
CPC ............. H04N 21/442–44222; H04N 21/4667
See application file for complete search history.

(56) References Cited

U.S. PATENT DOCUMENTS 5,872,588 A     2/1999   Aras et al.
6,177,931 B1    1/2001   Alexander et al.
(Continued)

FOREIGN PATENT DOCUMENTS

JP    2008134725      6/2008
KR    20090064142     6/2009
(Continued)

OTHER PUBLICATIONS

IP Australia, "Notice of Acceptance," dated Sep. 9, 2019 in connection with Australian Patent Application No. 2017279656, 3 pages.
(Continued)

*Primary Examiner* — Robert J Hance
(74) *Attorney, Agent, or Firm* — Hanley, Flight & Zimmerman, LLC

(57) ABSTRACT

Methods and apparatus to monitor media presentations are disclosed. Example methods disclosed herein include presenting information via a display of a media device, the information indicating that monitor software in the media device can be enabled, the monitor software to monitor media presented by the media device, the monitor software to be disabled by default. Disclosed example methods also include detecting a first user input that is to authorize the monitor software in the media device to be enabled, and in response to detection of the first user input: (i) enabling the monitor software in the media device to generate and report at least one of video fingerprints, audio fingerprints, video watermarks or audio watermarks representative of media presented by the media device, and (ii) transmitting, via a network interface, a notification to a remote monitoring entity to indicate that the monitor software in the media device has been enabled.

12 Claims, 20 Drawing Sheets

Related U.S. Application Data continuation of application No. 14/073,656, filed on Nov. 6, 2013, now Pat. No. 9,510,049.

(60) Provisional application No. 61/774,461, filed on Mar. 7, 2013.

(51) Int. Cl.
*H04N 21/258* (2011.01)
*H04N 21/658* (2011.01)
*G06Q 30/02* (2012.01)

(52) U.S. Cl.
CPC . *H04N 21/44218* (2013.01); *H04N 21/44222* (2013.01); *H04N 21/44227* (2013.01); *H04N 21/6582* (2013.01); *G06Q 30/02* (2013.01)

(56) References Cited

U.S. PATENT DOCUMENTS

| | | | |
|---|---|---|---|
| 7,953,839 B2* | 5/2011 | Sim | H04L 43/0876 709/223 |
| 8,225,342 B2 | 7/2012 | Mears et al. | |
| 9,510,049 B2 | 11/2016 | Zimmerman | |
| 10,356,475 B2 | 7/2019 | Zimmerman | |
| 2002/0032906 A1 | 3/2002 | Grossman | |
| 2002/0112048 A1 | 8/2002 | Gruyer et al. | |
| 2003/0084439 A1 | 5/2003 | Perkins et al. | |
| 2004/0181818 A1* | 9/2004 | Heyner | H04N 21/4758 725/146 |
| 2007/0006250 A1 | 1/2007 | Croy et al. | |
| 2007/0006275 A1 | 1/2007 | Wright et al. | |
| 2007/0180463 A1 | 8/2007 | Jarman | |
| 2007/0214038 A1 | 9/2007 | Dolph | |
| 2007/0288952 A1 | 12/2007 | Weinblatt | |
| 2008/0255952 A1 | 10/2008 | Yen et al. | |
| 2008/0263579 A1 | 10/2008 | Mears et al. | |
| 2009/0271813 A1 | 10/2009 | Russ et al. | |
| 2009/0305680 A1 | 12/2009 | Swift et al. | |
| 2010/0064331 A1 | 3/2010 | Cooper | |
| 2010/0228677 A1* | 9/2010 | Houston | G06Q 50/00 705/310 |
| 2011/0088053 A1* | 4/2011 | Lee | H04H 60/59 725/19 |
| 2011/0131593 A1* | 6/2011 | Scott | H04N 21/64322 725/9 |
| 2012/0011531 A1 | 1/2012 | Levy et al. | |
| 2012/0072940 A1 | 3/2012 | Fuhrer | |
| 2012/0290265 A1 | 11/2012 | Crystal et al. | |
| 2012/0302222 A1 | 11/2012 | Williamson et al. | |
| 2013/0014137 A1 | 1/2013 | Bhatia et al. | |
| 2013/0080260 A1* | 3/2013 | French | G06Q 30/0251 705/14.66 |
| 2013/0111511 A1* | 5/2013 | Besehanic | H04N 21/26283 725/14 |
| 2013/0111531 A1 | 5/2013 | Kawai et al. | |
| 2013/0205311 A1* | 8/2013 | Ramaswamy | H04N 21/4532 725/9 |
| 2013/0205326 A1 | 8/2013 | Sinha et al. | |
| 2014/0129841 A1 | 5/2014 | McMillan | |
| 2014/0259032 A1 | 9/2014 | Zimmerman | |
| 2017/0041671 A1 | 2/2017 | Zimmerman | |
| 2017/0337579 A1* | 11/2017 | Krosky | H04L 51/02 |

FOREIGN PATENT DOCUMENTS

| | | |
|---|---|---|
| KR | 20120034525 | 4/2012 |
| KR | 20120042245 | 5/2012 |
| WO | 2014137414 | 9/2014 |

OTHER PUBLICATIONS

IP Australia, "Examination Report", mailed in connection with Australian Patent Application No. 2016210699, dated Jun. 5, 2017, 6 pages.

IP Australia, "Examination Report", mailed in connection with Australian Patent Application No. 2013203768, dated Jul. 11, 2014, 4 pages.

IP Australia, "Notice of Acceptance", mailed in connection with Australian Patent Application No. 2016210699, dated Sep. 18, 2017, 3 pages.

International Searching Authority, "International Search Report and Written Opinion", mailed in connection with corresponding International Patent Application No. PCT/US2013/068929 dated Feb. 27, 2014, 11 pages.

United States Patent and Trademark Office, "Non-Final Office Action", mailed in connection with U.S. Appl. No. 14/073,656, dated Jan. 20, 2015, 19 pages.

United States Patent and Trademark Office, "Final Office Action", mailed in connection with U.S. Appl. No. 14/073,656, dated Jul. 24, 2015, 28 pages.

United States Patent and Trademark Office, "Non-Final Office Action", mailed in connection with U.S. Appl. No. 14/073,656, dated Nov. 13, 2015, 21 pages.

United States Patent and Trademark Office, "Notice of Allowance", mailed in connection with U.S. Appl. No. 14/073,656, dated Jul. 29, 2016, 9 pages.

United States Patent and Trademark Office, "Notice of Allowance", mailed in connection with U.S. Appl. No. 15/299,156, dated Dec. 11, 2018, 8 pages.

United States Patent and Trademark Office, "Final Office Action," mailed in connection with U.S. Appl. No. 15/299,156, dated Aug. 27, 2018, 36 pages.

United States Patent and Trademark Office, "Non-final Office Action," mailed in connection with U.S. Appl. No. 15/299,156, dated Feb. 26, 2018, 38 pages.

IP Australia, "Examination Report No. 1," dated Dec. 11, 2018 in connection with Australian Patent Application No. 2017279656 (3 pages).

IP Australia, "Examination Report No. 2," dated Apr. 16, 2019 in connection with Australian Patent Application No. 2017279656 (6 pages).

IP Australia, "Examination Report," dated Dec. 4, 2020 in connection with Australian Patent Application No. 2019283813, 4 pages.

* cited by examiner

1000

| LINE | TIMESTAMP | RECORD DESCRIPTION |
|---|---|---|
| ... | ... | ... |
| 1002 | 3/1/2013 7:32:01PM | EVENT:POWER SET TO ON |
| 1004 | 3/1/2013 7:32:01PM | EVENT:TUNED TO CHANNEL 9 |
| 1006 | 3/1/2013 7:32:01PM | INFORMATIONAL:VOLUME LEVEL SET TO MUTE |
| 1008 | 3/1/2013 7:32:01PM | INFORMATIONAL:INPUT SET TO ATSC TUNER |
| 1010 | 3/1/2013 7:32:03PM | EVENT:INCREASED VOLUME LEVEL TO 11 |
| 1012 | 3/1/2013 7:32:15PM | EVENT:IDENTIFIED MEDIA(MEDIA ID=0x5C9A041F) |
| 1014 | 3/1/2013 7:32:15PM | INFORMATIONAL:VOLUME LEVEL SET TO 11 |
| 1016 | 3/1/2013 7:32:15PM | INFORMATIONAL:INPUT SET TO ATSC TUNER |
| ... | ... | ... |
| 1020 | 3/1/2013 8:15:07PM | EVENT:INPUT SET TO HDMI1 |
| 1022 | 3/1/2013 8:15:30PM | EVENT:IDENTIFIED MEDIA(MEDIA ID=0xB8E5C384) |
| 1024 | 3/1/2013 8:15:30PM | INFORMATIONAL:VOLUME LEVEL SET TO 11 |
| 1026 | 3/1/2013 8:15:30PM | INFORMATIONAL:INPUT SET TO HDMI1 |
| ... | ... | ... |
| 1030 | 3/1/2013 8:40:14PM | EVENT:POWER SET TO OFF |
| ... | ... | ... |
| 1040 | 3/15/2013 6:00:00PM | EVENT:POWER SET TO ON |
| 1042 | 3/15/2013 6:00:15PM | EVENT:INPUT SET TO HDMI2 |
| 1044 | 3/15/2013 6:10:11PM | EVENT:IDENTIFIED MEDIA(MEDIA ID=0x1DE84157) |
| 1046 | 3/15/2013 6:10:11PM | INFORMATIONAL:VOLUME LEVEL SET TO 11 |
| 1048 | 3/15/2013 6:13:04PM | EVENT:VOLUME SET TO MUTE |
| 1050 | 3/15/2013 6:15:11PM | EVENT:IDENTIFIED MEDIA(MEDIA ID=0x1DE84158) |
| 1052 | 3/15/2013 6:15:11PM | INFORMATIONAL:VOLUME LEVEL SET TO MUTE |
| ... | ... | ... |
| 1060 | 3/15/2013 6:40:00PM | EVENT:INPUT SET TO HDMI3 |
| 1062 | 3/15/2013 6:43:42PM | EVENT:MEDIA BEING PLAYED, NO IDENTITY AVAILABLE |
| 1064 | 3/15/2013 6:43:42PM | INFORMATIONAL:VOLUME LEVEL SET TO 11 |
| 1066 | 3/15/2013 7:56:00PM | EVENT:POWER SET TO OFF |

| LINE | TIMESTAMP | RECORD DESCRIPTION |
|---|---|---|
| ... | ... | ... |
| 1102 | 3/1/2013 7:59:30PM | EVENT: BEGIN RECORDING FAMILY GUY, SEASON 2, EPISODE 3 |
| 1104 | 3/1/2013 7:59:30PM | INFORMATIONAL: RECORDING ON CHANNEL 12 |
| 1106 | 3/1/2013 8:15:23PM | EVENT: PLAY FAMILY GUY, SEASON 2, EPISODE 3 |
| 1108 | 3/1/2013 8:15:23PM | INFORMATIONAL: RECORDED ON 3/1/2013 |
| 1110 | 3/1/2013 8:15:23PM | INFORMATIONAL: FIRST AIRED ON 12/26/1999 |
| 1112 | 3/1/2013 8:20:06PM | EVENT: SKIP FORWARD 30 SECONDS |
| 1114 | 3/1/2013 8:20:08PM | EVENT: SKIP FORWARD 30 SECONDS |
| 1116 | 3/1/2013 8:20:10PM | EVENT: SKIP FORWARD 30 SECONDS |
| 1118 | 3/1/2013 8:20:12PM | EVENT: SKIP FORWARD 30 SECONDS |
| 1120 | 3/1/2013 8:20:13PM | EVENT: SKIP BACKWARD 7 SECONDS |
| 1122 | 3/1/2013 8:20:14PM | EVENT: SKIP BACKWARD 7 SECONDS |
| ... | ... | ... |
| 1130 | 3/1/2013 8:30:30PM | EVENT: STOP RECORDING FAMILY GUY, SEASON 2, EPISODE 3 |
| ... | ... | ... |
| 1140 | 3/1/2013 8:40:14PM | EVENT: END PLAYBACK (END OF MEDIA) |
| 1142 | 3/1/2013 8:40:14PM | INFORMATIONAL: RECORDING NOT DELETED |
| ... | ... | ... |
| 1150 | 3/8/2013 8:59:30PM | EVENT: BEGIN RECORDING THE WALKING DEAD, SEASON 2, EP. 1 |
| 1152 | 3/8/2013 8:59:30PM | INFORMATIONAL: RECORDING ON CHANNEL 247 |
| 1154 | 3/8/2013 8:59:31PM | INFORMATIONAL: WARNING, RECORDING SPACE LOW (<10%) |
| 1156 | 3/8/2013 10:01:00PM | EVENT: STOP RECORDING THE WALKING DEAD, SEASON 2, EP. 1 |
| 1158 | 3/8/2013 10:01:00PM | INFORMATIONAL: WARNING, RECORDING SPACE LOW (<5%) |
| ... | ... | ... |

| LINE | TIMESTAMP | RECORD DESCRIPTION |
|---|---|---|
| 1202 | 3/15/2013 6:00:02PM | EVENT: POWER ON |
| 1204 | 3/15/2013 6:02:10PM | EVENT: PLAY MEDIA |
| 1206 | 3/15/2013 6:02:10PM | INFORMATIONAL: SOURCE = DVD DRIVE |
| 1208 | 3/15/2013 6:02:10PM | INFORMATIONAL: DVD LABEL = SLAPSHOT (1977) |
| 1210 | 3/15/2013 6:04:00PM | EVENT: FAST FORWARD (3X) |
| 1212 | 3/15/2013 6:05:30PM | EVENT: PLAY |
| 1214 | 3/15/2013 8:07:30PM | EVENT: END PLAYBACK |
| 1216 | 3/15/2013 8:22:30PM | EVENT: POWER OFF (AUTOMATIC POWER OFF) |

1300

| LINE | TIMESTAMP | RECORD DESCRIPTION |
|---|---|---|
| 1302 | 3/15/2013 7:15:07PM | EVENT: POWER ON |
| 1304 | 3/15/2013 7:18:42PM | EVENT: PLAY VIDEO GAME, TITLE=NHL '13 |
| 1306 | 3/15/2013 7:55:56PM | EVENT: POWER OFF |

FIG. 13

METHODS AND APPARATUS TO MONITOR MEDIA PRESENTATIONS

RELATED APPLICATION

This patent arises from a continuation of U.S. patent application Ser. No. 15/299,156, filed on Oct. 20, 2016, and entitled "METHODS AND APPARATUS TO MONITOR MEDIA PRESENTATIONS," which is a continuation of U.S. patent application Ser. No. 14/073,656, filed on Nov. 6, 2013, and entitled "METHODS AND APPARATUS TO MONITOR MEDIA PRESENTATIONS," which claims the benefit of U.S. Provisional Patent Application Ser. No. 61/774,461, which was filed on Mar. 7, 2013. Priority to U.S. patent application Ser. No. 15/299,156, U.S. patent application Ser. No. 14/073,656 and U.S. Provisional Patent Application No. 61/774,461 is claimed. U.S. patent application Ser. No. 15/299,156, U.S. patent application Ser. No. 14/073,656 and U.S. Provisional Patent Application No. 61/774,461 are hereby incorporated herein by reference in their respective entireties.

FIELD OF THE DISCLOSURE

This disclosure relates generally to monitoring media presentations, and, more particularly, to methods and apparatus to monitor media presentations.

BACKGROUND

Media providers and/or metering entities such as, for example, advertising companies, broadcast networks, etc. are often interested in the viewing, listening, and/or media behavior of audience members and/or the public in general. To collect these behaviors and/or interests, an audience measurement company may enlist panelists (e.g., persons agreeing to have their media exposure habits monitored) to cooperate in an audience measurement study. The viewing behavior of these panelists as well as demographic data about the panelists is collected and used to statistically determine (e.g., project, estimate, etc.) the size and demographics of a larger viewing audience. Traditionally, those panelists log their exposure to media (e.g., movies they have watched, television shows they have seen, etc.) in a notebook and send the notebook to the media provider and/or metering entity.

BRIEF DESCRIPTION OF THE DRAWINGS

FIG. 10 illustrates an example log of monitoring data stored by the example monitor associated with the example television of FIG. 9.

FIG. 11 illustrates an example log of monitoring data stored by the example monitor associated with the example set-top box of FIG. 9.

FIG. 13 illustrates an example log of monitoring data stored by the example monitor associated with the example gaming console of FIG. 9.

The figures are not to scale. Wherever possible, the same reference numbers will be used throughout the drawing(s) and accompanying written description to refer to the same or like parts.

DETAILED DESCRIPTION

Figure 1:
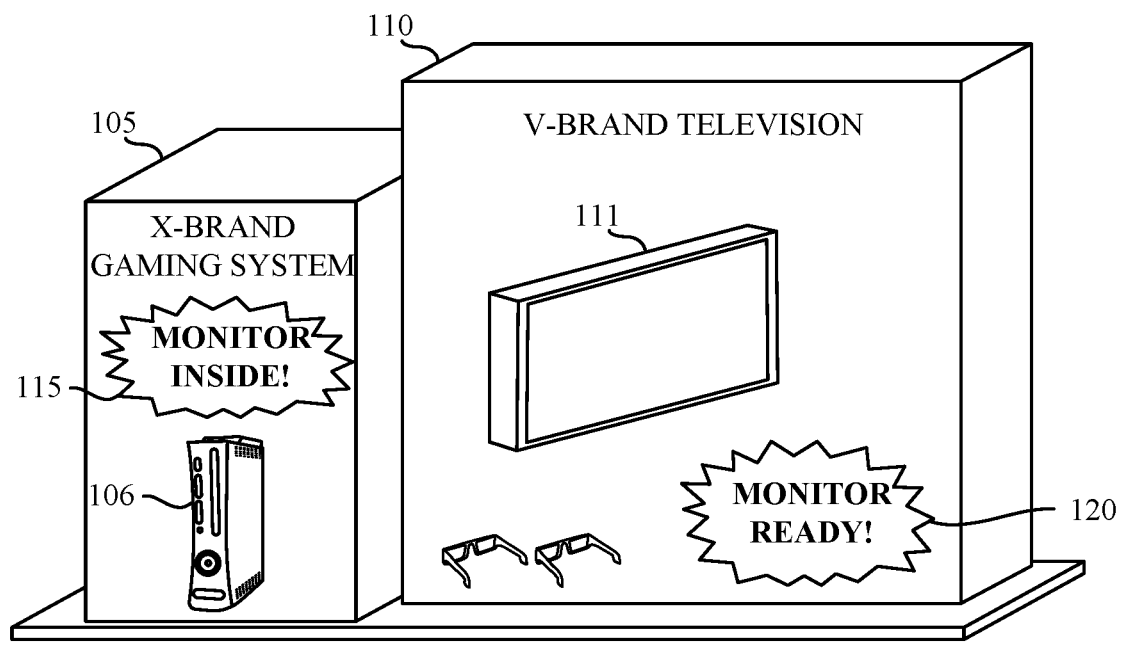
FIG. 1 illustrates example packaging for example media devices.

As used herein, the term "media" includes any type of audio and/or video content and/or advertisement, including television programming, radio, movies, web sites, etc. Example methods, apparatus, and articles of manufacture disclosed herein identify media presented via a media device. As described herein, a media device includes any device used in connection with presenting media to a user. For example, a media device may include (1) a media presentation device (e.g., a television, an Internet enabled television, an audio system, etc.), (2) a media transmitting device (e.g., an Internet radio streaming device, a personal computer, a Roku® media player, a Slingbox®, a Tivo®, an Apple TV®, a Xbox®, a PlayStation® 3, etc.), and/or (3) an auxiliary media device (e.g., 3D glasses, a Microsoft Kinect®, a PlayStation® Eye, a Razer Hydra, a Bluetooth headset, etc.). In some examples, usage information of media devices used in consumer locations (e.g., homes, offices, etc.) is collected and/or aggregated to determine ownership and/or usage statistics of various media devices, relative rankings of usage and/or ownership of media devices, type(s) of uses of media devices (e.g., whether a device is used for browsing the Internet, streaming media from the Internet, etc.), and/or other type(s) of media device information.

In known systems, the audience measurement data is collected using a metering and/or monitoring device separate from the media device (e.g., a set top box) installed at a location of a panelist (e.g., a panelist's home). These known metering devices collect metering information based on what is being presented in the vicinity of the metering device. That is, if a television is presenting a television show, the metering device identifies the television show and records audience measurement information based on the identification. In some examples, the metering device identifies the presented media using codes embedded in and/or signatures associated with the presented media. However, not all media may be accurately identified using codes and/or signatures. For example, when an audio source is muted and/or acoustic noise is present near the media device, accurately identifying a code and/or a signature present in the media may not be possible.

In some examples, the metering information identifies the media presentation device and/or the panelist associated with the media presentation. The audience measurement information may not identify and/or may inaccurately identify the source of the media (e.g., may not identify a streaming service provider such as, for example, Hulu®, Netflix®, Pandora®, Spotify®, iHeartRadio™, may not identify a local media providing device such as, for example, a digital versatile disk (DVD) player, a gaming console, etc.). The audience measurement information may not identify and/or may inaccurately identify the source of the media because the media device may not have access to such media-identifying information.

In examples disclosed herein, media monitoring functionality is integrated into the media device. Media monitoring functionality is implemented using monitor circuitry. The monitor is further described in connection with FIG. 3. Because the monitor is implemented internal to the media device, the monitor has access to information that would otherwise remain internal to the media device. For example, the monitor may have access settings such as a volume level, display settings, selected inputs, etc. In some examples, the monitor circuitry monitors data lines and/or buses within the media device to identify control signals within the media device. For example, the monitor may watch an input line such as, for example, an infrared (IR) sensor, a radio frequency (RF) sensor, etc. to identify control commands received from a user.

FIG. 1 illustrates example packaging 105, 110 for example media devices 106, 111. In the illustrated example, the media presentation device 106 is an electronic gaming system (e.g., a Microsoft Xbox®, a Sony PlayStation® 3, etc.). The example packaging 105 for the media presentation device 106 includes a label 115 indicating that the media presentation device 106 has a 'monitor inside.' For example, the indication of 'monitor inside' indicates to a purchaser that the media presentation device 106 has been implemented to monitor media consumption and/or presentation, generate media monitoring information, and/or send media monitoring information to a central facility, as described in conjunction with FIG. 2. For example, a monitoring entity may provide a manufacturer of the media device 106 with a software development kit (SDK) for integrating monitoring functionality in the media device 106 to perform the monitoring and sending monitoring information to the monitoring entity. In some examples, the SDK is provided to an entity other than the manufacturer (e.g., an application developer, an after-market modifier, etc.), to facilitate instrumentation of the monitoring functionality in the media device 106. In such an example, the monitoring functionality may be installed at time after manufacturing. In some illustrated examples, the media device 106 may be configured to perform monitoring as soon as the media device 106 is powered on. Alternatively, the media presentation device 102 may request user input (e.g., accepting an agreement, enabling a setting, etc.) before enabling monitoring.

In contrast to the packaging 105, the example packaging 110 includes a label 120 indicating that the media device is 'monitor ready.' The indication of 'monitor ready' indicates to the purchaser that monitoring functionality for the media device 111 may be installed and/or enabled after purchase. For example, monitoring functionality may be installed by, for example, downloading monitoring functionality from the Internet and installing the functionality, inserting and/or adding an additional circuit to the media device 111, etc. In some examples, the monitoring functionality may be installed at the time of purchase, and may be later enabled by, for example, receiving a user's consent to enable monitoring functionality. Alternatively, a manufacturer of the media device 111 may not include monitoring functionality in the media device 111 at the time of purchase and the monitoring functionality may be made available by the manufacturer, by a monitoring entity, by a third party, etc. for retrieval/download and installation on the media device 111.

Monitor Installed in a Media Presentation Device

Figure 2:
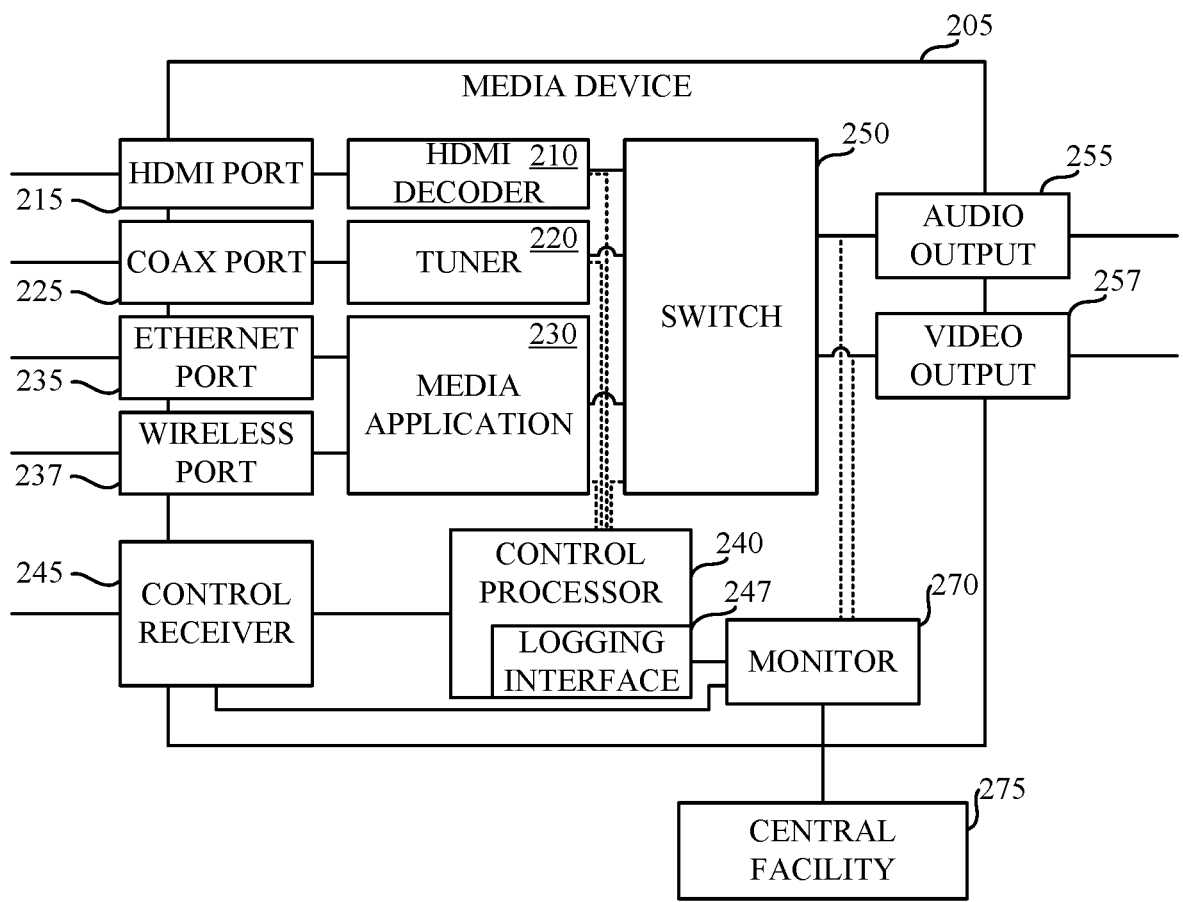
FIG. 2 is a block diagram of an example media device for monitoring media presentations.

FIG. 2 is a block diagram of an example media device 205 for monitoring media presentations. In the illustrated example of FIG. 2, the media device 205 is a media presentation device. In the examples disclosed herein the media device is, for example, a television, an Internet enabled television (e.g., a smart TV), an audio system (e.g., a receiver), etc. That is, the media device 205 presents media to one or more users via, for example, a display, speakers, etc. The media device 205 of the illustrated example of FIG. 2 includes a high definition media interface (HDMI) decoder 210, a tuner 220, a media application 230, a control processor 240, and a switch 250. The HDMI decoder 210 is connected to an HDMI port 215. The tuner 220 is connected to a coaxial port 225. The media application 230 is connected to an Ethernet port 235 and/or a wireless port 237. The control processor 240 receives commands from a control receiver 245. Based on those commands, the control processor controls the activities of the HDMI decoder 210, the tuner 220, the media application 230, and/or the switch 250. The switch 250, based on the control input received from the control processor 240, selects which input will be sent to an audio port 255 and a video port 257. The control processor 240 includes a logging interface 247. The logging interface 247 transmits log messages to a monitor 270. In the illustrated example, the monitor 270 additionally receives inputs from the audio output 255 and the video output 257. The monitor 270, based on the inputs received from the logging interface 247, the audio output 255, and/or the video output 257, stores audience measurement information. The monitor 270 transmits the audience measurement information to a central facility 275.

The example HDMI decoder 210 the illustrated example decodes HDMI data received via the HDMI port 215. In some examples the HDMI data may carry audio data, video data, control data, network data, etc. Thus, the HDMI decoder 210 may interpret any of these types of data such that the data may be presented to the user. In the illustrated example, audio and/or video is received via the HDMI port 215. The example HDMI port 215 is implemented to receive a first end of HDMI cable. A second end of the HDMI cable is connected to a different media device (e.g., a DVD player, gaming console, etc.) While in the illustrated example an HDMI port is used, any other type of audio and/or video port may additionally or alternatively be used. For example, audio and video may be received via an S-video port, a composite video port, component video port, a digital coax port, a Sony Philips Digital Interconnect Format (S/PDIF) port, a display port, USB port, serial port, VGA port, a DVI port, etc.

The example tuner 220 of the illustrated example tunes broadcast data received via the coax port 225. In the illustrated example, the tuner 220 is an advanced television systems committee (ATSC) tuner, and is capable of tuning high-definition television (HDTV) signals broadcast over the air. However, any other type of tuner may additionally or alternatively be used such as, for example, a cable card tuner, a National Television System Committee (NTSC) tuner, etc. While in the illustrated example a coax port 225 is used, any other type of port for receiving broadcast media may additionally or alternatively be used such as, for example, an Ethernet port, a wireless port, etc.

The example media application 230 of the illustrated example is an application that is executed by the media presentation device 205. In the illustrated example, media application is implemented by a smart TV application. However, any other type of application may additionally or alternatively be used such as, for example, a Pandora application, a Netflix application, a Hulu application, etc. In the illustrated example, the media application 230 retrieves media from an Internet and/or a network location so that the media may be displayed to the user. In the illustrated example, media is received via the Ethernet port 235 and/or the wireless port 237. The Ethernet port 235 is a network port that is connected to an Ethernet network via an Ethernet cable. The wireless port 237 connects the media device 205 to the network using a wireless network connection such as, for example Wi-Fi. While in the illustrated example Wi-Fi is used as a wireless network connection, any other type of wireless networking technology may additionally or alternatively be used such as, for example, Bluetooth, near field communication (NFC), a cellular radio, etc.

The example control receiver 245 of the illustrated example receives commands from a user via infrared (IR) signaling. That is, commands to, for example, change a channel, increase volume, modify a setting for a selected input, etc. are received via the control receiver 245. In some examples, the control receiver 245 receives commands via radio frequency (RF) communication, network communication, etc. In the illustrated example, the commands received by the control receiver 245 are passed to the control processor 240. In some examples, commands received by the control receiver 245 are also passed to and/or monitored by the monitor 270.

In the illustrated example, infrared commands received for the media device 205 are monitored. However, infrared commands associated with multiple devices are typically broadcast by control devices (e.g., remote controls) to multiple infrared receivers. That is, an infrared command from a remote control associated with a DVD player may be received by a television. The television may not recognize the command (because it is a command associated with the DVD player), and may not perform any action in response to the command. However, the monitor 270 may store the command regardless of whether the media device 205 is able to decode and/or process the command. Storing commands that cannot be decoded and/or processed by the media device enables the monitor 270 to gather information related to activities of other nearby media devices. For example, if an infrared command instructing a DVD player to play media is received by a monitor associated with a television, the monitoring data stored by the monitor may be analyzed to identify that the DVD player was the source of the media.

The example control processor 240 of the illustrated example of FIG. 2 is implemented by a logic circuit such as a processor executing instructions, but it could additionally or alternatively be implemented by an application specific integrated circuit(s) (ASIC(s)), programmable logic device(s) (PLD(s)) and/or field programmable logic device(s) (FPLD(s)), an analog circuit, and/or other circuitry. The example control processor 240 of the illustrated example controls operation of the example HDMI decoder 210, the example tuner 220, the example media application 230, and/or the example switch 250. In some examples, the control processor 240 may control operation of other components of the media device 205. For example, the control processor 240 may control which wireless network to which the wireless port 237 is connected, the control processor 240 may control volume settings for the audio output 255, the control processor 240 may control video settings for the video output 257, etc.

The example control processor 240 of the illustrated example of FIG. 2 includes a logging interface 247. The example logging interface 247 outputs information (e.g., a stream of activity notifications) that may be analyzed to identify what the media device 205 is doing at a particular time. For example, the logging interface 247 may output information such as, for example, an indication that the control processor 240 is instructing the tuner 220 to change to a particular channel, an indication that the control processor 240 received an instruction from the control receiver 245, an indication that the control processor 240 is instructing the switch 250 to route media from the media application 230 to the audio and video outputs 255, 257, an indication that the control processor 240 is instructing the media application 230 to etc. In the illustrated example, the logging interface 247 outputs the information to the monitor 270.

The example monitor 270 of the illustrated example of FIG. 2 is implemented by a logic circuit such as a processor executing instructions, but it could additionally or alternatively be implemented by an ASIC(s), PLD(s) and/or FPLD(s), an analog circuit, and/or other circuitry. The example monitor 270 receives information related to the activities of the media device 205 and stores the information in a data store. In some examples, the monitor 270 receives information from the audio and/or video output 255, 257 so that the monitor 270 may identify the media being presented. For example, the monitor 270 may analyze the media to identify codes and/or signatures associated with the presented media. The example monitor 270 transmits the information in the data store to the central facility 275 so that it may be analyzed.

The example central facility 275 of the illustrated example is implemented by one or more servers that collect and process audience measurement data from the media device 205 to generate media monitoring information and/or reports. The central facility 275 analyzes the audience measurement data to identify, for example, which media presentation devices are the most-frequently owned, which media presentation device are the most-frequently used, which media presentation devices are the least-frequently owned, which media devices are the least-frequently used, which media providers are the most/least-frequently used, when particular media is presented, and/or any other media statistics or information that may be determined from the data. In some examples, the central facility 275 analyzes the audience measurement data to identify the most/least-frequently used type(s) of media devices for particular type(s) and/or genre(s) of media. The audience measurement data may also be correlated or processed with factors such as demographic and/or geo-demographic data (e.g., a geographic location of the media exposure measurement location, age(s) of the panelist(s) associated with the media presentation location, an income level of a panelist, etc.) to facilitate extrapolation and/or projection of media exposure to population(s) of interest. Media device information may be useful to manufacturers and/or advertisers to determine which features should be improved, determine which features are popular among users, identify geo-demographic trends with respect to media presentation devices, identify market opportunities, develop and/or create advertisements and/or advertisement campaigns, determine amounts to be paid for advertisements, and/or otherwise evaluate their own and/or their competitors' products and/or marketing efforts. Media provider information may be useful to media providers, advertisers, etc. to determine costs of advertisements broadcast by the media provider, comparative levels of customers that use different media providers, etc.

Figure 3:
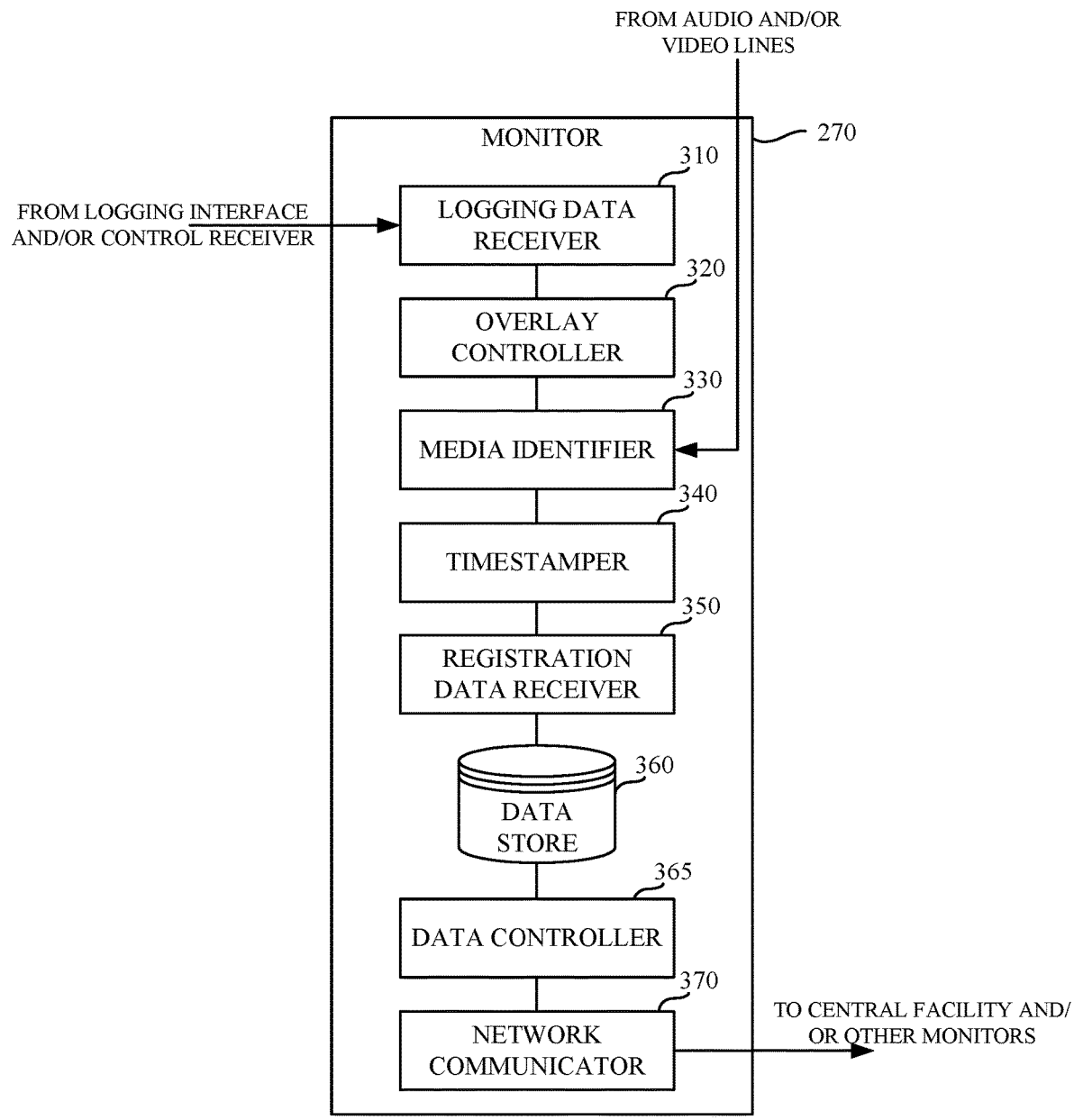
FIG. 3 is a block diagram of the example monitor of the example media device of FIG. 2.

FIG. 3 is a block diagram of the example monitor 270 of the example media device of FIG. 2. The example monitor 270 of FIG. 3 includes a logging data receiver 310, an overlay controller 320, a media identifier 330, a timestamper 340, a registration data receiver 350, a data store 360, a data controller 365, and a network communicator 370.

The example logging data receiver 310 of the illustrated example of FIG. 3 is implemented by a logic circuit such as a processor executing instructions, but it could additionally or alternatively be implemented by an application specific integrated circuit(s) (ASIC(s)), programmable logic device(s) (PLD(s)), field programmable logic device(s) (FPLD(s)), an analog circuit, and/or digital circuitry. The example logging data receiver 310 receives logging data related to the activities of the media device 205 from the logging interface 247 of the control processor 240. The example logging data receiver 310 stores the received logging data in the data store 360.

The example overlay controller 320 of the illustrated example of FIG. 3 is implemented by a logic circuit such as a processor executing instructions, but could additionally or alternatively be implemented by any other logic circuit, ASIC, DSP, FPGA, and/or other analog and/or digital circuitry. In the illustrated example, the overlay controller 320 interacts with the control processor 240 to present an overlay via the audio and/or video output(s) 255, 257. For example, the overlay controller 320 may cause a prompt to be displayed by the media device 205 to, for example, request that a user of the media device 205 identify themselves, to request a user of the media device to enter demographic information, to request permission to enable monitoring of the media device 205, etc.

Example overlays presented using the overlay controller 320 may include a prompt requesting an answer to a yes or no question (e.g., "Mike, is that you watching the TV? (1) yes, or (2) no", "Is there anyone else watching the TV with you? (1) yes, or (2) no", etc.), a prompt requesting an answer to a multiple-choice question (e.g., "Can you please identify yourself: (1) Mike, (2) Bob, (3) Cheryl, (4) Someone else"), a prompt requesting feedback about the media being presented, etc. In some examples, the overlay controller 320 interacts with the media device 205 to cause an overlay of the media device to be presented. For example, the overlay controller 320 may cause an overlay used with a Microsoft Xbox® that includes an avatar of the user. Presenting an avatar that is used with other media devices (e.g., a Microsoft Xbox®, a Nintendo Wii®, etc.) enables the user to more quickly determine whether the monitor 270 has properly identified the user. Furthermore, using an avatar that the user is already familiar with (by virtue of using that avatar with their media devices), creates a more immersive presentation and/or monitoring experience.

The example media identifier 330 of the illustrated example of FIG. 3 is implemented by a logic circuit such as a processor executing instructions, but could additionally or alternatively be implemented by any other logic circuit, ASIC, DSP, FPGA, and/or other analog and/or digital circuitry. The example media identifier 330 receives input from the audio and/or video output(s) 255, 257. The media identifier 330 processes the inputs to identify the media being presented by the media device 205. Identifying the media at this stage, as well as at the logging information level, enables identification of media that may not be identified based solely on the logging information received from the logging interface 247. In the illustrated example of FIG. 3, the media identifier 330 uses codes and/or watermarks to identify the media. Indicia identifying the media such as, for example, a code, a signature, a watermark, a fingerprint, and/or any information derived from, extracted from, converted from, etc. a code, a signature, a watermark, a fingerprint, etc. are stored by the media identifier 330 in the data store 360.

Audio watermarking is a technique used to identify media such as television broadcasts, radio broadcasts, advertisements (television and/or radio), downloaded media, streaming media, prepackaged media, etc. Existing audio watermarking techniques identify media by embedding audio codes (e.g., a watermark), such as media identifying information and/or an identifier that may be mapped to media identifying information, into an audio and/or video component having a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and compared to reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A good signature is one that is repeatable when processing the same media presentation, but that is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that matched the monitored signature. Because attributes, such as an identifier of the media, a presentation time, a broadcast channel, etc., are collected for the reference signature, these attributes may then be associated with the monitored media whose monitored signature matched the reference signature.

The example timestamper 340 of the illustrated example of FIG. 3 is implemented by a logic circuit such as a processor executing instructions, but could additionally or alternatively be implemented by any other logic circuit, ASIC, DSP, FPGA, and/or other analog and/or digital circuitry. In the illustrated example of FIG. 3, the timestamper 340 timestamps media identifications and/or logging data stored in the data store 360 by the logging data receiver 310, the media identifier 330, the registration data receiver 350, etc. Timestamping (e.g., recording a time and/or a date that an event occurred) enables accurate identification and/or correlation of media that was presented with persons in the audience.

The example registration data receiver 350 of the illustrated example of FIG. 3 is implemented by a logic circuit such as a processor executing instructions, but could additionally or alternatively be implemented by any other logic circuit, ASIC, DSP, FPGA, and/or other analog and/or digital circuitry. In the illustrated example, demographic information is obtained from the user when the user joins (i.e., registers for) the panel. In the illustrated example, the registration data (e.g., demographic information) is received via the logging data receiver 310 in response to a prompt displayed to the user by the overlay controller 320. Additionally or alternatively, the demographic information may be obtained from the user in any other way (e.g., via a telephone interview, by having the user complete an online survey, etc.). Additionally or alternatively, panelists may be contacted and/or enlisted using any desired methodology (e.g., random selection, statistical selection, phone solicitations, Internet advertisements, surveys, advertisements in shopping malls, product packaging, etc.). The example registration data receiver 350 stores the received registration data in the example data store 360.

The example data store 360 of the illustrated example of FIG. 3 may be any device for storing data such as, for example, flash memory, magnetic media, optical media, etc. Furthermore, the data stored in the data store 360 may be in any data format such as, for example, binary data, comma delimited data, tab delimited data, structured query language (SQL) structures, etc. While, in the illustrated example, the data store 360 is illustrated as a single database, the data store 360 may be implemented by any number and/or type(s) of databases.

The example data controller 365 of the illustrated example of FIG. 3 is implemented by a logic circuit such as a processor executing instructions, but could additionally or alternatively be implemented by any other logic circuit, ASIC, DSP, FPGA, and/or other analog and/or digital circuitry. In the illustrated example, the data controller 365 manages records stored in the data store 360. For example, the data controller 365 controls transmission of stored records, deletion of aged records, determining if a storage threshold of the data store 360 is exceeded, etc.

The example network communicator 370 of the illustrated example of FIG. 3 is an Ethernet interface. In the illustrated example, the network communicator 370 transmits data stored in the data store 360 to the central facility 275. In one example, the data is transmitted to the central facility 275 using one or more HTTP requests. For example, the HTTP request may be a dummy request in that it is not intended to receive data, but rather is used as a vehicle to carry monitoring data (e.g., panelist demographic information, logging data information, media identifying information, etc.) to the central facility 275. However, any other way of transmitting data may additionally or alternatively be used such as, for example, a file transfer protocol (FTP), etc. In some examples, the network communicator 370 is used to transmit monitoring data from one monitor 270 to another. For example, in an audio-visual system having multiple components (e.g., a television, a set-top box, a receiver, a DVD player, etc.), each component may include a monitor 270. As described in connection with FIGS. 6-8, monitoring data may be transmitted from one monitor to another prior to being transmitted to the central facility 275.

While in the illustrated example, the network communicator 370 is an Ethernet interface, any other type of interface may additionally or alternatively be used. For example, the network communicator 370 might include one or more of a Bluetooth interface, a Wi-Fi interface, a digital subscriber line (DSL) interface, a T1 interface, etc. While in the illustrated example a single network communicator 370 is shown, any number and/or type(s) of network communicators may additionally or alternatively be used. For example, two network communicators (e.g., an Ethernet interface and a Bluetooth interface) may be used. In such an example, a first network communicator (e.g., an Ethernet interface) may receive and/or transmit monitoring data to the central facility 275, while a second network communicator may receive and/or transmit monitoring data to and/or from other media monitors. In the illustrated example, the network communicator 370 of the illustrated example periodically and/or a-periodically transmits monitoring data from the data store 360 to the central facility 275.

Monitor Installed in a Media Device

Figure 4:
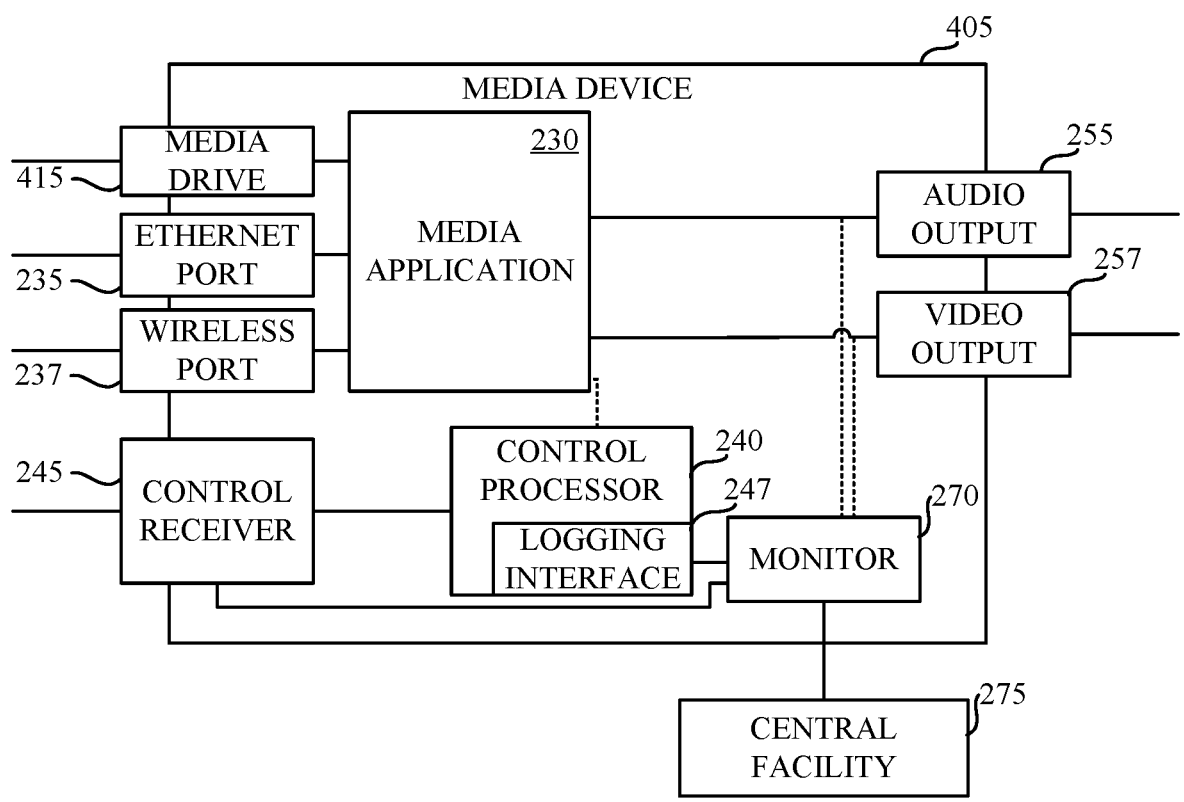
FIG. 4 illustrates an alternative implementation of the example media device of FIG. 2.

FIG. 4 illustrates an alternative media device 405 of the example media device 205 of FIG. 2. As described above, the example media device 205 of FIG. 2 includes the HDMI decoder 210, the tuner 220, and the switch 250. The example media device 405 of FIG. 4 does not include the HDMI decoder 210, the tuner 220, or the switch 250. That is, the media device 205 of FIG. 2 represents a device including multiple inputs and switching capacity such as, for example, an audio/video receiver, a television, etc. The example media device 405 of FIG. 4 represents a device such as, for example, a set top box, a DVD player, a gaming console (e.g., a Microsoft Xbox®, a Nintendo Wii®, etc.) etc.

The example media device 405 includes the Ethernet port 235, the wireless port 237, the media application 230, the control receiver 245, the control processor 240, the logging interface 247, the audio output 255, and the video output 257. Furthermore, the example media device 405 of FIG. 4 includes a media drive 415. However, additional and/or alternative example media devices may or may not include all of these components. For example, an Internet streaming device (e.g., a Roku media player, an Apple TV®, etc.) may not include the media drive 415 and the Ethernet port 235. In the illustrated example of FIG. 4, the media application 230 receives media from one or more of the media drive 415, the Ethernet port 235, and the wireless port 237. The example media device 405 of FIG. 4 includes the monitor 270.

The example media drive 415 of the illustrated example of FIG. 4 is implemented by a DVD drive. However, the media drive 415 may be implemented by any other device and or device interface that stores and/or receives data. For example, the media drive 415 may be implemented by a universal serial bus (USB) port that receives media via a USB source (e.g., a host computer, a hard disk drive, a USB flash drive, etc.). Additionally or alternatively, the media drive 415 may be implemented by a Blu-ray drive, a hard disk drive, a CD drive, a laserdisc drive, etc. However, any other past, present, and/or future type of device for storing and/or receiving media may additionally or alternatively be used.

Monitor Installed in an Auxiliary Media Device

Figure 5:
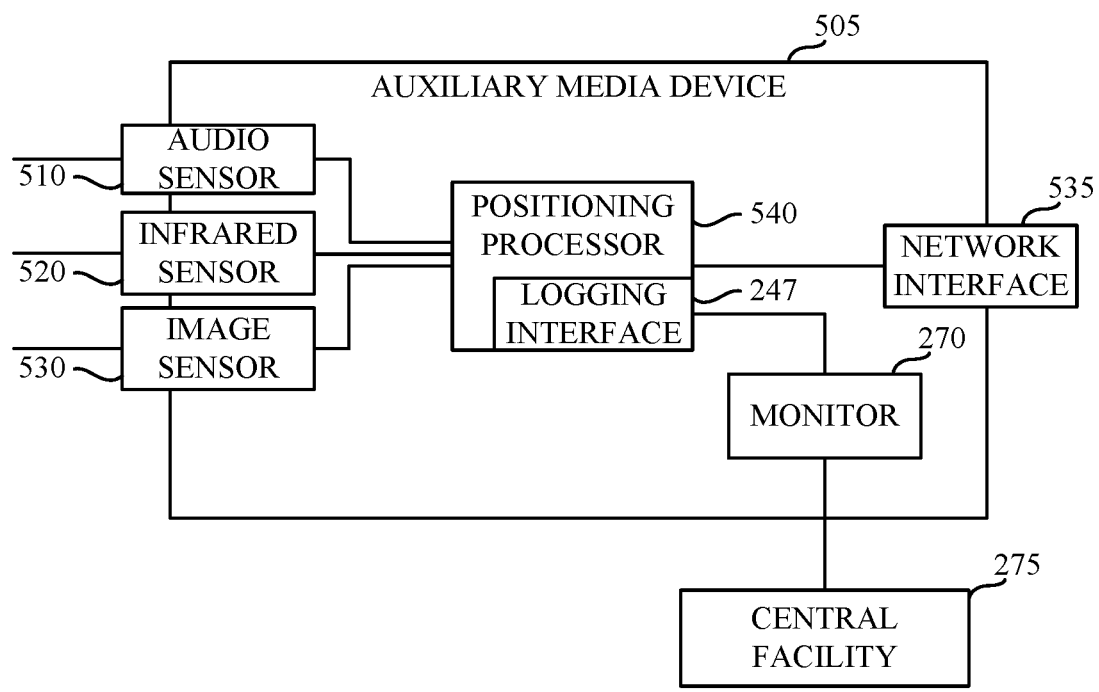
FIG. 5 illustrates an alternative implementation of the example media device of FIG. 2.

FIG. 5 illustrates an alternative media device 505 of the example media device 205 of FIG. 2. In contrast to the illustrated examples of FIGS. 2 and/or 4, the example media device 505 of FIG. 5 is an auxiliary media device. That is, the media device 505 is used in connection with another media device (e.g., the media device 205 of FIG. 2, the media device 405 of FIG. 5, etc.). As disclosed herein, the media device 505 is a media device that interfaces with another media device for media related functionality, but not for direct media presentation functionality. The media device 505 of the illustrated example of FIG. 5 provides control information such as, for example, a position of a user, an audible command received from a user, an infrared signal, etc. to the media device 405. In some examples, the media device 505 may be implemented by, for example, 3D glasses, a Microsoft Kinect®, a PlayStation® Eye, a Razer Hydra, a Bluetooth headset, etc. The example media device 505 of the illustrated example of FIG. 5 includes an audio sensor 510, an infrared sensor 520, an image sensor 530, a network interface 535, a positioning processor 540, a logging interface 247, and a monitor 270.

The example audio sensor 510 of the illustrated example of FIG. 5 is implemented by a microphone. However, any other type(s) and/or number(s) of audio sensor may additionally or alternatively be used. For example, the audio sensor 510 may be implemented by an audio pickup, a piezoelectric sensor, etc. In the illustrated example, the audio sensor 510 is used to receive audio input from a user of the media device 505. The audio input may be used to, for example, control an interaction with the media device (e.g., to control a video game), identify the user, identify a location of the user (e.g., near the audio sensor 510, far from the audio sensor 510, etc.), etc.

The example infrared sensor 520 of the illustrated example of FIG. 5 is implemented by an infrared emitter (e.g., an infrared light emitting diode (LED)) and an infrared detector. That is, the example infrared sensor 520 is implemented as an active infrared sensor. Active infrared sensors project an infrared signal using the LED into an area and measure a reflection of the projected infrared signal to determine one or more characteristics of the measured area. However, any other type of infrared sensor may additionally or alternatively be used such as, for example a passive infrared sensor. Passive infrared sensors do not include an infrared emitter and, instead, measure infrared signals that are already present in the measured area. In some examples, the infrared sensor 520 is used to receive infrared commands from a remote device such as, for example, a remote control.

The example image sensor 530 of the illustrated example of FIG. 5 is implemented by a charge coupled device (CCD) and/or a complimentary metal-oxide semiconductor (CMOS) sensor. However, any other type of image sensor may additionally or alternatively be used. In the illustrated example, the image sensor faces outwards into a presentation area (e.g., towards a user). In the illustrated example, the image sensor 530 is used to determine a position of the user, identify presence of a user, identify how many users are present, etc. In some examples, the image sensor 530 is positioned facing another media device to, for example, identify what is being presented by the media device. For example, the image sensor 530 may be positioned towards a television so that the auxiliary media device 505 may be used to identify media being presented by the television.

In the illustrated example, the example infrared sensor 520 and/or the example image sensor 530 are used to determine a position of the user. For example, the infrared sensor 520 and/or the image sensor 530 may be used to determine a position of a body part of the user (e.g., a head, a torso, an arm, a leg, etc.) In some examples, the position of the body part is used to identify a user. For example, a user may be requested to identify themselves by, for example, waving an arm. In the illustrated example, the user may waive their arm in response to a request for information such as, for example, "Mike, please wave if that is you," "Please raise your arm if you found a last commercial entertaining," etc. Requests for such information may be presented to the user via the overlay controller 320 of FIG. 3.

The example network interface 535 of the illustrated example of FIG. 5 is implemented by an Ethernet interface. In the illustrated example, the network interface 535 transmits information to other media devices based on instructions received from positioning processor 540. Such information may include, for example, controls received from a user, a position of the user, etc. While in the illustrated example, the network communicator 535 is an Ethernet interface, any other type of interface may additionally or alternatively be used. For example, the network communicator 370 might include one or more of a Bluetooth interface, a Wi-Fi interface, a digital subscriber line (DSL) interface, a T1 interface, etc. While in the illustrated example a single network communicator 370 is shown, any number and/or type(s) of network communicators may additionally or alternatively be used.

The example positioning processor 540 of the illustrated example of FIG. 5 is implemented by a logic circuit such as a processor executing instructions, but it could additionally or alternatively be implemented by an application specific integrated circuit(s) (ASIC(s)), programmable logic device(s) (PLD(s)), field programmable logic device(s) (FPLD(s)), an analog circuit, and/or digital circuitry. In the illustrated example, the positioning processor 540 receives inputs from the audio sensor 510, the infrared sensor 520, and/or the image sensor 530. The received inputs are used to, for example, identify a position of user, identify a user, determine a number of users present, etc. Such information may be transmitted to other media devices to for example, control the other media devices. The example positioning processor 540 of the illustrated example of FIG. 5 includes a logging interface 247. The example logging interface 247 outputs information (e.g., a stream of activity notifications) that may be analyzed to identify what the media device 505 is doing at a particular time. For example, the logging interface 247 may output information such as, for example, an identification of a user, a position of a user, a control received from a user, etc. Furthermore, the logging interface 247 may output diagnostic information regarding the operation of the media device 505 such as, for example, whether the device is powered on, whether the network interface 535 is connected, etc. In the illustrated example, the logging interface 247 outputs the information to the monitor 270.

The example monitor 270 of the illustrated example of FIG. 2 is implemented by a logic circuit such as a processor executing instructions, but it could additionally or alternatively be implemented by an ASIC(s), PLD(s) and/or FPLD(s), an analog circuit, and/or other circuitry. The example monitor 270 receives information related to the activities of the media device 505 and stores the information in a data store (e.g., the data store 360). In some examples, the monitor 270 receives information from the audio sensor 510 and/or the image sensor 530 to, for example, identify codes and/or signatures associated with the media presented in the vicinity of the media device 505. The example monitor 270 transmits the information to the central facility 275 so that it may be analyzed.

Multiple Monitors in Communication with Each Other

Figure 6:
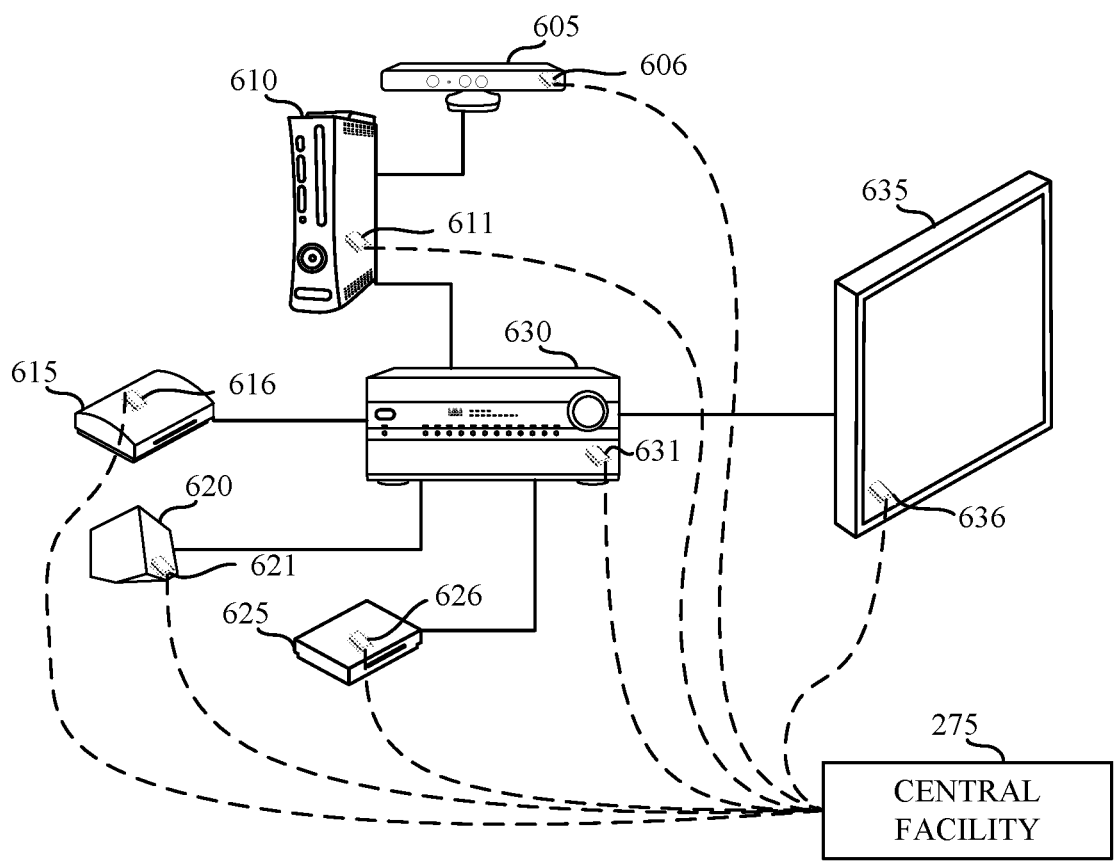
FIG. 6 illustrates an example system wherein the respective monitor of each media device reports monitoring information directly to the central facility of FIG. 2.
Figure 7:
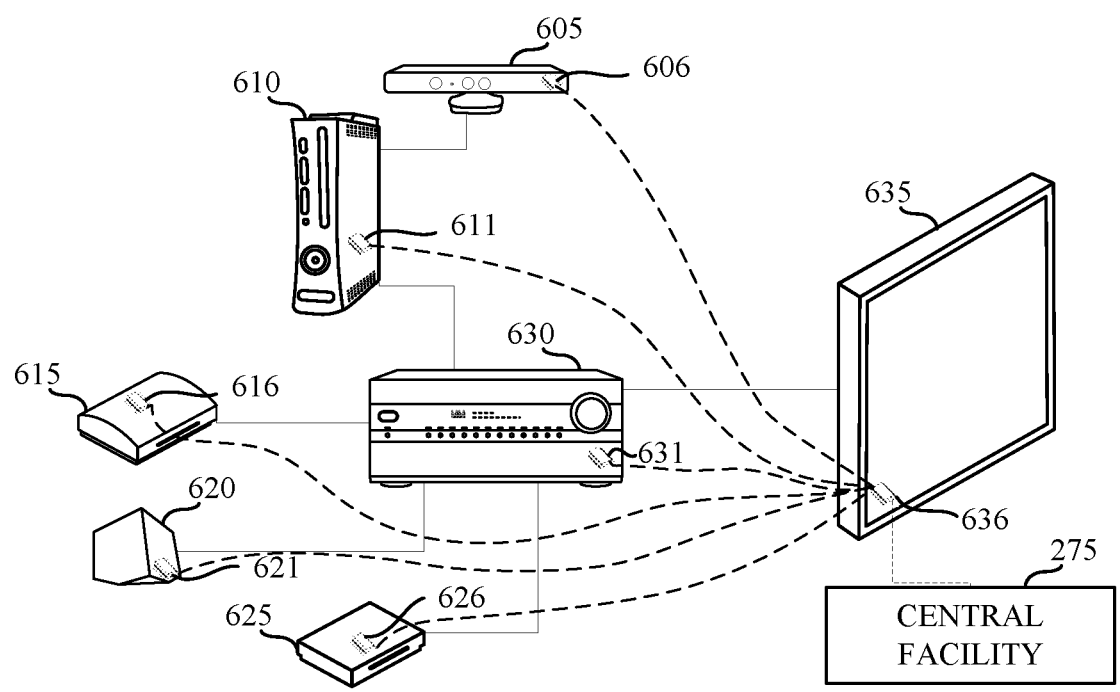
FIG. 7 illustrates an example system wherein the respective monitors of the media devices report monitoring information to a master monitor, which then reports the monitoring information to the central facility of FIG. 2.

In the examples disclosed herein, media devices and/or monitors associated therewith may be configured in any number of ways to transmit monitoring information to the central facility 275. FIGS. 6, 7, and/or 8 illustrate example configurations of media devices and show how the example media devices may transmit the monitoring information to the central facility 275.

FIG. 6 illustrates an example system, in which the respective monitor of each media device reports monitoring information directly to the central facility 275 of FIG. 2. The illustrated example of FIG. 6 includes a media device 605. In the illustrated example, the media device 605 is implemented as an auxiliary media device such as, for example, a Microsoft Kinect® sensor. However any other type of media device may additionally or alternatively be used such as, for example, a video game controller, a PlayStation eye, a Razer Hydra, etc. In the illustrated example, the media device 605 includes a monitor 606. The example monitor 606 monitors operations performed by the media device 605. The example monitor 606 of FIG. 6 transmits information regarding the operations of the media device 605 directly to the central facility 275.

The illustrated example of FIG. 6 includes a media device 610. In the illustrated example, the media device 605 is implemented as a gaming console such as, for example, a Microsoft Xbox®. However any other type of media device may additionally or alternatively be used such as, for example, a Sony PlayStation®, a Nintendo Wii®, a personal computer, etc. In the illustrated example, the media device 610 receives control input from the media device 605. In the illustrated example, the media device 610 includes a monitor 611. The example monitor 611 monitors operations of the media device 610. Monitoring operations of the media device 610 enables, for example, identification of a game being played, identification of an avatar of a user, identification of streaming media presented via the media device 610, etc. The example media device 610 of FIG. 6 transmits audio and/or video outputs to the media device 630.

The example media device 630 of the illustrated example of FIG. 6 is represented as an audio and/or video receiver. The example media device 630 receives audio and/or video inputs from one or more audio and/or video sources (e.g., media devices), and selects a source to be transmitted to a media device 635 (e.g., a television, etc.). The example media device 630 of the illustrated example of FIG. 6 includes a monitor 631. The example monitor 631 monitors operations of the media device 630. For example, the monitor 631 identifies which input is selected for output, a power state of the media device 630, a volume level of the media device 630, etc. The example monitor 631 of FIG. 6 transmits such monitoring information directly to the central facility 275.

The example media device 630 of the illustrated example of FIG. 6 transmits a selected audio and/or video input to the media device 635. In the illustrated example, the media device 635 is implemented as a media presentation device (e.g., a television). However, the media device may be implemented by any other type of media presentation device. For example, the media device 635 may be implemented as a computer monitor, a plasma TV, an audio system (e.g., speakers), etc. the example media device 635 includes a monitor 636. The example monitor 636 monitors operations of the media device 635. For example, the monitor 636 identifies a volume level of the media device 635, a power state of the media device 635, a selected input of the media device 635, a selected channel of the media device 635, etc. The example monitor 636 of FIG. 6 transmits monitoring information regarding the operation of the media device 635 directly to the central facility 275.

The example media device 630 receives inputs from other media devices such as, for example, a media device 615 (e.g., a DVD player, CD player, etc.), a media device 620 (e.g., a streaming media device such as a Roku media device, and Apple TV®, etc.), and a media device 625 (e.g., a digital video recorder (DVR), a set top box, etc.). However, the example media device 630 may receive audio and/or video input from any number and/or type(s) of media devices. In the illustrated example of FIG. 6, each of the media devices 615, the media device 620, and the media device 625 include a respective monitor 616, 621, and 626. The monitors 616, 621, and 626 monitor the operations of the respective media devices 615, 620, and 625. In the illustrated example, the monitors 616, 621, 626 monitor, for example, starts and stops of recordings, when media is streamed to the associated media device, identifiers of media presented in association with the media device, etc. The monitors 616, 621, and 626 transmit monitoring information regarding the operations of the media devices 615, 620, and 625 directly to the central facility 275.

In the illustrated example of FIG. 6, each of the monitors 606, 611, 616, 621, 626, 631, 636 transmits monitoring information directly to the central facility 275. In the illustrated example, monitoring information is transmitted via the Internet. However, individually configuring each monitor to be able to transmit data via the Internet to the central facility 275 may be difficult and/or time consuming. For example, if the monitors are to transmit information via a Wi-Fi network within proximity of the monitors, in some examples, they must each be individually configured to transmit information via the Wi-Fi network. To reduce the amount of configuration time, in some examples, configuration information concerning which Wi-Fi network to connect to and/or credentials for connecting to the Wi-Fi network is shared among the monitors 606, 611, 616, 621, 626, 631, 636. That is, a user (e.g., a panelist, an installer and/or representative of a monitoring entity) may only need to configure a single monitor to enable all monitors to communicate monitoring information to the central facility 275. In some examples, configuration information and/or credentials for the Wi-Fi network may be transmitted between the monitors using a mesh network (e.g., a network of Bluetooth devices, an ad hoc Wi-Fi network, etc.)

FIG. 7 illustrates an example system wherein the respective monitors 606, 611, 616, 621, 626, 631, 636 of the media devices 605, 610, 615, 620, 625, 630, 635 report monitoring information to a master monitor, which then reports the monitoring information to the central facility 275 of FIG. 2. In the illustrated example of FIG. 7, the monitor 636 is configured as a master monitor. The other monitors 606, 611, 616, 621, 626, 631 transmit monitoring information to the monitor 636. In the illustrated example of FIG. 7, the monitors 606, 611, 616, 621, 626, 631 transmit the monitoring information to the monitor 636 via Bluetooth. However any other way of transmitting data may additionally or alternatively be used such as, for example, a Wi-Fi network, radio frequency communication, an Ethernet cable, a universal serial bus (USB) cable, etc. The monitor 636 aggregates the received monitoring information in a data store (e.g., the data store 360) and periodically and/or a periodically transmits the monitoring information to the central facility 275.

In the illustrated example, the master monitor is shown as the monitor 636. However, the master monitor may be implemented using any other monitor. For example, the master monitor may be implemented by monitor 631. Furthermore, multiple master monitors may be used. In some examples the number and/or types of media devices present is dependent on a configuration of an entertainment system (e.g., a home entertainment system). Different entertainment systems may be configured differently. For example, one entertainment system may include an audio and/or video receiver while another may not. Furthermore, the entertainment system may be changed over time. For example, a media device (e.g., a television) may be replaced with a newer and/or different media device, a media device may be removed from the entertainment system (e.g., a user may no longer use a compact disc (CD) player in their entertainment system), a media device may be added to the entertainment system (e.g., new devices may be added as new media formats are created), etc.

To account for such varying configurations, the monitors 606, 611, 616, 621, 626, 631, 636 communicate with each other to select a monitor to function as the master monitor. The master monitor may be selected based on any number of criteria such as, for example, wireless signal strength between the master monitor and other monitors, the capacity of the media device associated with the monitor to receive user input (e.g., for configuring whether the monitors have permission to monitor the operations of the respective media devices, for configuring how the monitor transmits information to the central facility 275, etc.), the type of communication medium available for transmitting monitoring information to the central facility 275 (e.g., wired connections may be preferred over wireless connections), a storage capacity of the data store of the selected master monitor, an expected longevity of the selected master monitor (e.g., televisions and/or audio receivers may be changed every five to ten years, whereas gaming consoles and/or streaming media devices may be changed every one to three years, etc.), etc. Once selected, the monitors 606, 611, 616, 621, 626, 631 stream monitoring information to the master monitor 636. However, any other way of transmitting monitoring information may additionally or alternatively be used. For example, the monitors 606, 611, 616, 621, 626, 631 may locally store information and periodically and/or aperiodically transmit the monitoring information to the master monitor 636.

Figure 8:
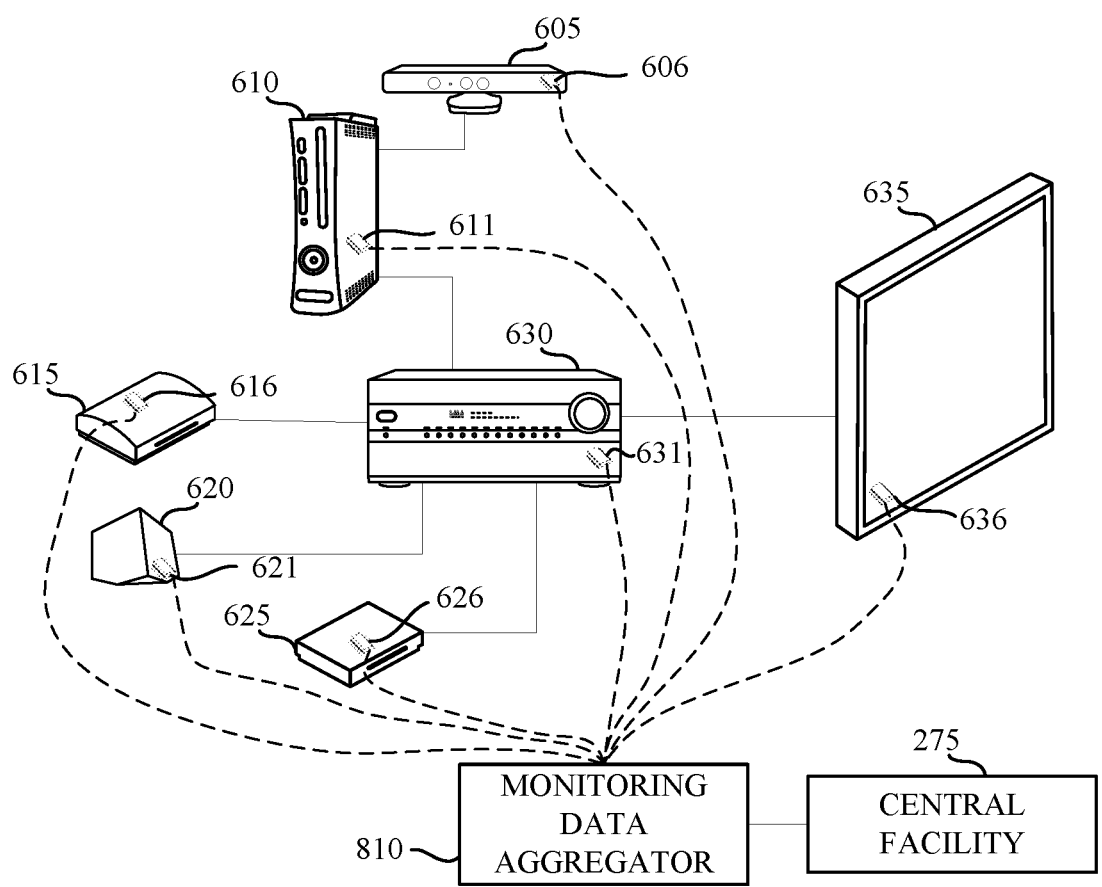
FIG. 8 illustrates an example system wherein the respective monitor of each media device reports monitoring information to a local monitoring data aggregator, which then reports the monitoring information to the central facility of FIG. 2.

FIG. 8 illustrates an example system wherein the respective monitor 606, 611, 616, 621, 626, 631, 636 of each media device 605, 610, 615, 620, 625, 630, 635 reports monitoring information to a local monitoring data aggregator 810, which then reports the monitoring information to the central facility 275 of FIG. 2. Because entertainment systems are prone to change, a media device including a monitor selected as a master monitor may be removed without notice. In such an example, data transmitted to the master monitor may be lost. Such data loss is undesired as it will likely result in an incomplete data set. Furthermore, media devices may be powered off and/or unplugged during periods of inactivity. If, for example, the master monitor were powered off while other monitors were monitoring operations of their respective media devices, such monitoring information may not be stored by the master monitor.

To account for such scenarios, a monitoring data aggregator 810 is used in the illustrated example of FIG. 8. The example monitoring data aggregator 810 of the illustrated example of FIG. 8 is implemented by a logic circuit such as a processor executing instructions, but it could additionally or alternatively be implemented by an ASIC(s), PLD(s) and/or FPLD(s), an analog circuit, and/or other circuitry. The monitoring data aggregator 810 is a monitor (such as the monitor 270) that is separate from a media device. In the illustrated example, the monitoring data aggregator 810 receives power separately from the media devices 605, 610, 615, 620, 625, 630, 635. Accordingly, when the media device 605, 610, 615, 620, 625, 630, 635 is unplugged, the monitoring data aggregator 810 is not affected. The monitoring data aggregator functions as a master monitor in that it receives monitoring data from other monitors 606, 611, 616, 621, 626, 631, 635, and relays the received information to a central facility 275.

Example Use Case(S)

In the examples disclosed herein, each media device (e.g., the media devices 605, 610, 615, 620, 625, 630, 635) includes a monitor (e.g., the monitors 606, 611, 616, 621, 626, 631, 636). Each monitor stores data (e.g., monitoring data) based on the operation of the respective media device. In the illustrated example, each monitor stores the monitoring information in a data store local to the monitor. As disclosed herein, the monitor may transmit the monitoring data to the central facility 275 in any number of ways. FIG.

Figure 12:
FIG. 12 illustrates an example log of monitoring data stored by the example monitor associated with the example digital versatile disk (DVD) player of FIG. 9.

9 illustrates an example order of events associated with different media devices. FIGS. 10, 11, 12, and/or 13 illustrate example logs 1000, 1100, 1200, and 1300 of monitoring data recorded by monitors associated with different media devices.

Figure 9:
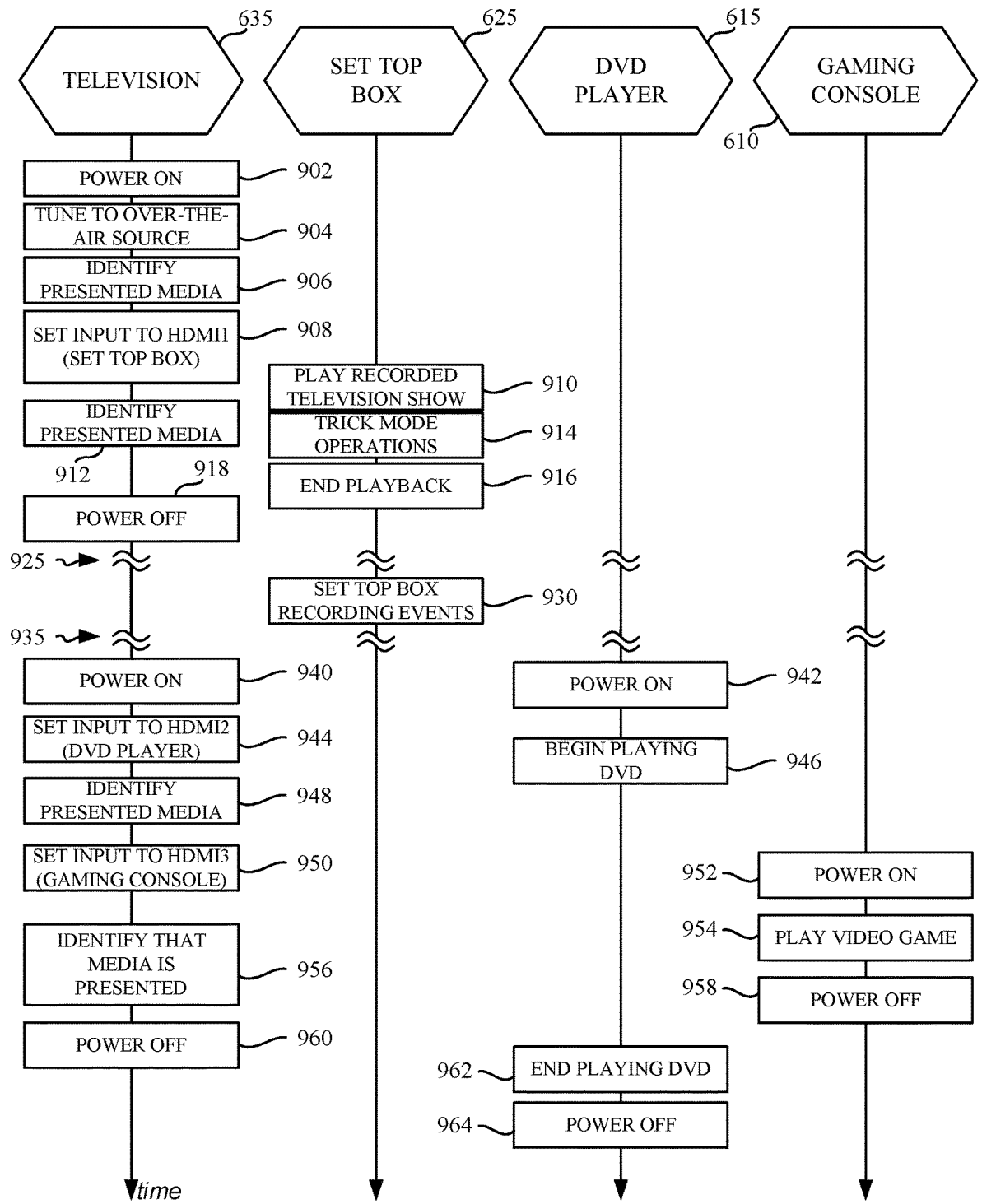
FIG. 9 illustrates an example order of events associated with different media devices.

In the illustrated example of FIG. 9, events associated with the media device 635, the media device 620, the media device 615, and the media device 610. In the illustrated example of FIG. 9, the events identified by the monitors of the respective media devices are arranged in chronological order (e.g., from the top of FIG. 9 to the bottom of FIG. 9). For enhanced clarity, while the example media devices 635, 620, 615, and 610 correspond to the media devices shown in FIG. 6, they are further referred to herein as the television 635, the set-top box 620, the DVD player 615, and the gaming console 610 to reflect the media functions they perform. However, any other media device may additionally or alternatively be used. FIGS. 10-13 illustrate example logs of monitoring data that may be stored to reflect the activities of the television 635, the streaming media player 620, the DVD player 615, and the gaming console 610 as described in connection with FIG. 9.

The illustrated example of FIG. 9 begins when the television 635 is powered on (block 902). The example television 635 is tuned to an over-the-air (OTA) media source such as, for example, an Advanced Television Systems Committee (ATSC) broadcast (block 904). The monitor 636 associated with the television 635 identifies the media presented by the television (block 906). The input of the television 635 is then set to input High Definition Media Interface 1 (HDMI1) (block 908). In the illustrated example, the input labeled HDMI1 is associated with the set-top box 620. However, the input labeled HDMI1 may be associated with any other media device.

The set-top box 620 begins playing a recorded television show (block 910). Meanwhile, because the input of the television has been selected as HDMI1 corresponding to the set-top box 625, the monitor associated with the television 635 identifies the presented media (block 912). The set top box 625 then performs one or more trick mode operations (block 914). Such trick mode operations may include, for example, skipping ahead thirty seconds within a media presentation, fast-forwarding, rewinding, pausing, playing, skipping backwards seven seconds, etc. Once the television show is completed the set-top box 625 ends playback of recorded television show (block 916). The television 635 is then powered off (block 918).

A first break 925 in the timeline illustrates that some time has passed after the television 635 is powered off at block 918. The set-top box 625 records television shows according to a schedule selected by user (block 930). For example, the user may have previously selected a number of television shows they are interested in to have them recorded so that the recorded television shows can be viewed at a later time.

A second break 935 and the timeline illustrates that additional time is past after the set-top box recorded the television shows in block 930. After the second break 935, the television 635 is powered on (block 940). At approximately the same time, the DVD player 615 is powered on (block 942). The selected input of the television is changed to HDMI2, which corresponds to the DVD player 615 (block 944). The DVD player 615 then begins playing a DVD (block 946). The monitor 636 associated with the television 635 identifies the media presented by the television 635 (block 948). In the illustrated example, the monitor 636 identifies the media associated with the DVD player 615.

During playback of the DVD, the selected input of the television is changed to HDMI3, which corresponds to the gaming console 610 (block 950). The gaming console 610 is then powered on (block 952). Meanwhile playback of the DVD via the DVD player 615 has not stopped. That is, the DVD player is still playing the DVD, however the media is not being displayed because the input selected on the television has been changed to a different media device (i.e., the gaming console 610). Identifying such a scenario enables the central facility 275 to properly credit the media for the time it was presented.

The gaming console 610 begins playing a video game (block 954). In the illustrated example, the monitor 636 may not be able to identify the video game played by the gaming console 610. However, the monitor 636 identifies that media is being presented via the selected input associated with the gaming console 610 (block 956). The gaming console 610 is then powered off (block 958). The television 635 is powered off (block 960). The DVD player 615 then completes playback of the DVD (block 962). That is, from the time that the input of the television 635 was changed in block 950 until the time that the DVD player completed playback in block 962, the DVD player was playing the DVD but it was not presented via the television 635. After a period of inactivity, the DVD player is powered off (block 964).

FIGS. 10, 11, 12, and/or 13 illustrate example logs 1000, 1100, 1200, and 1300 of monitoring data recorded by monitors associated with different media devices. The example logs 1000, 1100, 1200, and/or 1300 each include a line number column, a timestamp column, and a record description column. In the illustrated examples, the timestamp column stores a timestamp of the corresponding row. The record description column describes the logged record. In the illustrated examples of FIGS. 10, 11, 12, and/or 13, different types of records are logged. For example, an event record such as, for example, the event record of line 1002 of FIG. 10, shows an event detected by the monitor. An event record may include, for example, a record of when a device was powered on, a record of a tuning event (e.g., a channel change), a record of a selected input, a record of digital video recorder (DVR) activity, a record of identified media, a record of a volume level, etc. Other types of records may additionally or alternatively be stored such as, for example, informational records, diagnostic records, no-activity records, etc.

In the illustrated examples of FIGS. 10, 11, 12, and/or 13, each line represents a single record. However, multiple records having the same and/or different type may be combined to form a single record. For example, an informational record indicating a volume level may be combined with an event record indicating that a channel was changed. In the illustrated examples of FIGS. 10, 11, 12, and/or 13, records are stored as text data. However, records may be stored in any other format such as, for example, binary data, column separated values (CSV), structured query language (SQL) data structures, etc.

FIG. 10 illustrates an example log 1000 of monitoring data stored by the example monitor 636 of the example television 635 of FIG. 9. The example log 1000 includes an event record (line 1002) indicating that the television 635 was powered on. The example line 1002 corresponds to block 902 of FIG. 9. The television 635 is tuned to channel 9 (line 1004). The example line 1004 corresponds to block 904 of FIG. 9. The tuning event of line 1004 results in the recordation of informational records indicating a volume level of the television 635 (line 1006), and a selected input (line 1008). In the illustrated example, the volume level of line 1006 is set to mute, indicating that audio is not presented by the television 635. The example line 1008 indicates the television is set to the selected input of an ATSC tuner (e.g., an over-the-air media source). In the illustrated example, the records associated with lines 1004, 1006, and 1008 are recorded at substantially the same time (e.g., in response to same tuning event). In the illustrated example, lines 1006 and 1008 are recorded separately from line 1004. However, in some examples, the records are recorded in the same record and/or line. A volume level of the television 635 is then increased to eleven (line 1010).

The monitor 636 identifies media presented via television 635 (line 1012). In the illustrated example, line 1012 includes a media identifier that identifies the media. In the illustrated example, the media identifier is a hexadecimal string of characters that uniquely identifies the media. However, any other type(s) and/or format(s) of media identifier may additionally or alternatively be used. For example, the media identifier may be derived from a code and/or signature identified in the media, and/or may alternatively be a code and/or signature itself. In the illustrated example, informational events are also recorded indicating that the volume level is set to eleven (line 1014), and that the input is sent to the ATSC tuner (line 1016). However any other informational announcement additionally or alternatively be stored such as, for example, a selected channel, a name of a service provider associated with the selected input (e.g., a cable provider, a satellite television provider, etc.), a name of the media to which the television is tuned (e.g., a name of a television show, a name of a movie, etc.). Lines 1012, 1014, and 1016 correspond to block 906 of FIG. 9.

In the illustrated example, the input of the television is changed to HDMI1 (line 1020). However, the input of the television 635 may be changed to any other input such as, for example, a different tuner, a media application (e.g., a Pandora application, a Hulu application, a Netflix application, etc.), a different input (e.g., an HDMI input, a composite video input, etc.), etc. The example monitor 636 identifies media presented via the television 635 (line 1022). In the illustrated example, the example media identified in association with line 1022 is different than the example media identified in association with line 1012. In the illustrated example, informational events associated with (line 1022) are also recorded. For example, an informational event indicating the volume level of the television 635 at the time line 1022 was recorded is stored as line 1024. In the illustrated example, an informational event indicating that the input of the television 635 was set HDMI1 at the time line 1022 was recorded is stored as line 1026. In the illustrated example, lines 1022, 1024, and 1026 correspond to block 912 of FIG. 9.

The television 636 is powered off (line 1030). Line 1030 corresponds to block 918 of FIG. 9. While in the illustrated example line 1030 stores a record of the power state of the television 636 as "OFF," any other power state may additionally or alternatively be stored. For example, if the television 636 was to enter a low-power state (e.g., a sleep state, a hibernation state, etc.) after a period of inactivity, an identification of the low power state may be recorded in the example log 1000.

The television 636 is powered on (line 1040). Line 1040 corresponds to block 940 of FIG. 9. In the illustrated example, shortly after the television 636 is powered on line 1040, the input of the television 636 is set to HDMI2 (line 1042). Line 1042 corresponds to block 944 of FIG. 9. In the illustrated example, HDMI2 corresponds to an input from the DVD player 615. However, the HDMI2 input may correspond to any other media device.

In the illustrated example, the monitor 636 identifies media presented by the television 635 (line 1044). In response to the identification of the media, the monitor 636 stores an informational record indicating that the volume level of the television 636 was set to eleven (line 1046). The volume level of the television 636 is then set to mute by a user (line 1048). While the television 636 is muted, the monitor 636 identifies media presented via the television 635 (line 1050). In the illustrated example, the media identifier of line 1050 represents a code and/or signature associated with the DVD played by the DVD player. In the illustrated example, the media identifier of line 1050 represents an incremental serial number when compared to the media identifier of line 1044. That is, the media identifier of line 1050 represents a sequential code and/or signature during playback of DVD after the media identifier identified in line 1044. However, in some examples non-sequential media identifiers may be used. In response to identifying the media in line 1050 the monitor 636 stores and informational record indicating the volume level is set to mute (line 1052). Lines 1044, 1046, 1048, 1050, and 1052 correspond to block 948 of FIG. 9.

The input of the television 636 is then set to HDMI3 (line 1060). In the illustrated example, input HDMI3 is associated with the gaming console 610. Line 1060 corresponds to block 950 of FIG. 9. The monitor 636 identifies the media has been played, but that it is not able to identify played media (line 1062). Line 1062 corresponds to block 956 of FIG. 9. In some examples, an indication the media is being played, but cannot be identified sometimes indicates that a video game is being played. The monitor 636 records and informational record indicating that the volume level of the television 635 is set to eleven at the time that the identification of line 1062 was made (line 1064). The monitor 636 then records that the television 635 is powered off (line 1066). Line 1066 corresponds to block 960 of FIG. 9.

FIG. 11 illustrates an example log 1100 of monitoring data stored by the example monitor 626 of the example set-top box 625 of FIG. 9. In the illustrated example of FIG. 11, the example log 1100 begins with an indication that the example set top box 625 recorded media (line 1102). In the illustrated example, the recorded media is a television show (e.g., Family Guy). However, any other type of media may additionally or alternatively be recorded such as, for example, a movie, music, etc. In the illustrated example, the meter 626 records and identifier of the media being recorded in (line 1102). In the illustrated example, the identifier of the media is a name of the media and a series/episode identifier; however, any other format and/or notation may be used for identifying the recorded media. In the illustrated example, the identifier of the recorded media is received based on a guide of the set-top box 625 that identifies a schedule of television shows broadcast by a service provider. However, the identifier of the recorded media may come from any other source such as, for example, an identifier transmitted within the media (e.g., a code and/or signature). In the illustrated example, the meter 626 stores an informational record indicating that the recording of line 1102 is performed while tuned to channel twelve (line 1104). In some examples, information such as a timestamp and a channel identifier may be used to determine what is recorded by the set-top box after such information is transmitted to the central facility 275. For example, when a timestamp and a channel identifier are associated with a geographic location and/or a service provider, particular media (e.g., a television show, etc.) may be identified.

After the set top box 625 begins recording the media at line 1102, the set-top box 625 begins playback of the recorded media. The meter 626 stores a record indicating that the recorded television show is being played (line 1106). At substantially the same time, the meter 626 stores informational records indicating a date that the recorded television show was recorded by the set-top box 625 (line 1108), and a date that the recorded television show was first aired (line 1110). However, any other information may additionally or alternatively be recorded such as, for example, a rating of the media (e.g., a parental guidance rating such as PG, PG-13, R, TV-PG, TV-MA, etc., parental guidance sub-ratings such as, dialog (D), sexual content (S), violence (V), language (L), etc.), a name of an actor appearing in the media, and identifier of the user present during the media presentation, etc. Lines 1106, 1108, and 1110 of the illustrated example of FIG. 11 correspond to block 910 of FIG. 9.

The example set top box 625 performs a number of trick mode operations (lines 1112, 1114, 1116, 1118, 1120, and 1122). As shown in the illustrated example of FIG. 11, trick mode operations include skipping forward (lines 1112, 1114, 1116, and 1118) and skipping backward (lines 1120 and 1122). However, any other trick mode operation may additionally or alternatively be used. For example, trick mode operations may include fast forwarding, pausing, playing, rewinding, stopping, etc. While in the illustrated example lines 1112, 1114, 1116, and 1118 indicate that the trick mode operation skipped forward thirty seconds, any other skipping duration may additionally or alternatively be used. Furthermore, while the example lines 1120 and 1122 indicate that the trick mode operation skipped backwards seven seconds, any other skipping duration may additionally or alternatively be used. For example, the set-top box 625 may skip forward fifteen seconds and backward three seconds. In the illustrated example, lines 1112, 1114, 1116, 118, 1120, and 1122 corresponds to block 914 of FIG. 9. In some examples, trick mode operations may be used to determine, for example, which segments of media a user is more likely to skip through (e.g., commercials, credits, etc.).

In the illustrated example of FIG. 11, the set-top box 625 ceases recording of the media (line 1130). In the illustrated example, the record of line 1130 indicates that the recording was stopped thirty seconds after the allotted airtime for the media expired. However, in some examples, the set-top box 625 may determine that aired media may run longer than the allotted time (e.g., a sports event that the goes into overtime). In the illustrated example, even though the set-top box 625 ceased recording the media as of line 1130, playback of the media continues until line 1140. In some examples, identifying when playback has completed (e.g., as in line 1140) is useful because it assists in determining how long recorded media is stored on the set top box 625 before the media is played. In the illustrated example, the monitor 626 stores an indication that playback is complete (line 1140). In the illustrated example, the record of line 1140 additionally indicates that the entirety of the media was played by denoting "end of media." In some examples, the record may alternatively indicate a total duration of playback, a time within the media at which the playback was stopped, etc. Furthermore, the monitor 626 stores an informational record indicating that the media (e.g., the previous recording) was not deleted (line 1142). In the illustrated example of FIG. 11, lines 1140 and 1142 correspond to block 916 of FIG. 9.

After the television 635 has been powered off (e.g., as in block 918 of FIG. 9), the set-top box 625 may record additional media. In the illustrated example, the monitor 626 identifies that the set-top box 625 begins recording additional media (e.g., a television show such as, for example, "The Walking Dead") (line 1150). In the illustrated example of FIG. 11, the monitor 626 stores an informational record indicating a channel to which the set-top box was tuned when the recording started (line 1152). In the illustrated example, the monitor 626 further stores an informational record indicating that available recording space available on the set-top box 625 reached a lower threshold (line 1154). However, any other informational record may additionally or alternatively be stored. The set-top box 625 ceases recording the media approximately one hour after the recording was started. However, any other duration of media may additionally or alternatively be used. The monitor 626 stores a record indicating that the set-top box 625 has stopped recording (line 1156). In the illustrated example, the monitor 626 stores an informational record indicating that the available recording space on the set-top box 625 is below the lower threshold (line 1158). Storing information such as recording thresholds and/or available storage space may be useful because it can be used to identify what types of media users delete from their set-top box 625 without having first been viewed by the user when available storage space is low. For example, such information may be used to determine whether a user is more inclined to delete a recorded television show than a recorded movie when the available storage space of the set-top box 625 is below a threshold (e.g., below twenty five percent remaining storage space available, less than three gigabytes of storage space available, less than five hours of available recording space, etc.). In the illustrated example, lines 1150, 1152, 1154, 1156, and 1158 correspond to block 930 FIG. 9.

FIG. 12 illustrates an example log 1200 of monitoring data stored by the monitor 616 of the DVD player 615 of FIG. 9. In the illustrated example of FIG. 12, the DVD player 615 is powered on. The monitor 616 associated with the DVD player 615 stores a record indicating that the DVD player 615 is powered on (line 1202). In some examples, the record indicating that the DVD player 615 is powered on indicates how the power on instructions received by the DVD player 615. For example, the record may indicate that the DVD player 615 was powered on by a user pushing a power button physically located on the DVD player. Alternatively, the record may indicate that the DVD player 615 was powered on by user pushing a power button on a remote device associated with the DVD player (e.g., a remote control). In the illustrated example of FIG. 12, line 1202 corresponds to block 942 of FIG. 9.

The DVD player 615 then begins playing media (e.g., a DVD). A record of the played media is stored by the monitor 616 (line 1204). The example monitor 616 additionally stores informational records related to the playback of the media. In the illustrated example, the monitor 616 stores a record indicating that the source of the media is a DVD drive (line 1206). However, any other media source may additionally or alternatively be used such as, for example, a streaming media source, a hard disk drive, etc. The example monitor 616 stores a record of an identifier retrieved from the media (line 1208). In the illustrated example, the label indicates a title of the played DVD. However, any other type of identifier may additionally or alternatively be used such as, for example, a code, a signature, and identifier derived from a code and/or signature, etc. In the illustrated example of FIG. 12, lines 1204, 1206, and 1208 correspond to block 946 of FIG. 9.

The illustrated example of FIG. 12, the DVD player 615 fast forwards playback of the media. A record of the fast-forward event is stored by the monitor 616 (line 1210). In the illustrated example, the media is fast forwarded at a rate of three times the normal play-rate. However, any other play-rate and/or media playback operation may additionally or alternatively be used. The DVD player 615 then resumes the normal play-rate, and the monitor 616 stores a record indicating the change in playback speed (line 1212). In some examples, stored records of playback speed may be used to identify which portions of media were presented, which portions of media users are more likely to fast-forward through, etc.

In the illustrated example, the DVD player 615 ends playback of the media. The monitor 616 records an event indicating the termination of playback (line 1214). Storing the record indicating the stop time of is useful because it assists in calculating and/or determining which portions of the media were presented. After a period of that inactivity, the DVD player 615 automatically powers down. The monitor 616 stores a record of the power-down operation (line 1216). In the illustrated example, line 1216 indicates that the power-down operation was automatic (e.g., triggered by the DVD player after a period of inactivity). However, in some examples, the record indicating the power-down operation may indicate that the power-down operation was performed at the request of the user. In the illustrated example of FIG. 12, line 1216 corresponds to line 964 of FIG. 9.

FIG. 13 illustrates an example log 1300 of monitoring data stored by the monitor 611 of the gaming console 610 of FIG. 9. In the illustrated example of FIG. 13, the gaming console 610 is powered on. The monitor 611 associated with the gaming console 610 stores a record indicating that the gaming console 610 is powered on (line 1302). The gaming console 610 then begins playing a videogame. The monitor 611 identifies that the videogame is being played and stores a record of the identification (line 1304). In the illustrated example, the monitor 611 identifies the title of the video game being played. However, additional details related to the video game such as, for example a rating of the video game, a level within the game played by the user, a difficulty setting played by the user, the genre etc. may be recorded. The title and/or the genre of the videogame may later be used to correlate different types of video games to different users. For example, a user who is more interested in sporting events may be more likely to play a sports related videogame. The gaming console 610 is then powered down. The monitor 611 stores a record of the power-down event (line 1306).

While an example manner of implementing the monitor 270 of FIGS. 2, 4, and/or 5 is illustrated in FIG. 3, one or more of the elements, processes and/or devices illustrated in FIG. 3 may be combined, divided, re-arranged, omitted, eliminated and/or implemented in any other way. Further, the example logging data receiver 310, the example overlay controller 320, the example media identifier 330, the example timestamper 340, the example registration data receiver 350, the example data store 360, the example data controller 365, the example network communicator 370, and/or, more generally, the example monitor 270 of FIG. 3 may be implemented by hardware, software, firmware and/or any combination of hardware, software and/or firmware. Thus, for example, any of the example logging data receiver 310, the example overlay controller 320, the example media identifier 330, the example timestamper 340, the example registration data receiver 350, the example data store 360, the example data controller 365, the example network communicator 370, and/or, more generally, the example monitor 270 of FIG. 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example logging data receiver 310, the example overlay controller 320, the example media identifier 330, the example timestamper 340, the example registration data receiver 350, the example data store 360, the example data controller 365, and/or the example network communicator 370 are hereby expressly defined to include a tangible computer readable storage device or storage disc such as a memory, DVD, CD, Blu-ray, etc. storing the software and/or firmware. Further still, the example monitor 270 of FIG. 3 may include one or more elements, processes and/or devices in addition to, or instead of, those illustrated in FIG. 3, and/or may include more than one of any or all of the illustrated elements, processes and devices.

Flowcharts representative of example machine readable instructions for implementing the example monitor 270 of FIG. 3 is shown in FIGS. 14, 15, 16, 17, 18, and/or 19. In these examples, the machine readable instructions comprise a program(s) for execution by a processor such as the processor 2012 shown in the example processor platform 2000 discussed below in connection with FIG. 20. The program(s) may be embodied in software stored on a tangible computer readable storage medium such as a CD-ROM, a floppy disk, a hard drive, a digital versatile disk (DVD), a Blu-ray disk, or a memory associated with the processor 2012, but the entire program and/or parts thereof could alternatively be executed by a device other than the processor 2012 and/or embodied in firmware or dedicated hardware. Further, although the example program(s) is described with reference to the flowchart illustrated in FIGS. 14, 15, 16, 17, 18, and/or 19, many other methods of implementing the example monitor 270 may alternatively be used. For example, the order of execution of the blocks may be changed, and/or some of the blocks described may be changed, eliminated, or combined.

As mentioned above, the example processes of FIGS. 14, 15, 16, 17, 18, and/or 19 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 14, 15, 16, 17, 18, and/or 19 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals and to exclude transmission media. As used herein, when the phrase "at least" is used as the transition term in a preamble of a claim, it is open-ended in the same manner as the term "comprising" is open ended.

Monitor Enables Monitoring Based on Permission Received from the User(s)

When monitoring functionality is provided with media devices, such monitoring functionality may be provided to users who do not wish to be monitored. Furthermore, some users expect to be compensated in exchange for their participation in the monitoring effort. To that extent, the monitor 270 provided with the media devices does not monitor users without first receiving their permission. In some examples, users may consent to different levels of monitoring. That is, a user may be comfortable with their television viewing habits being monitored, but not with having a camera (e.g., as part of an auxiliary media device) monitor who is present in a room.

Figure 14:
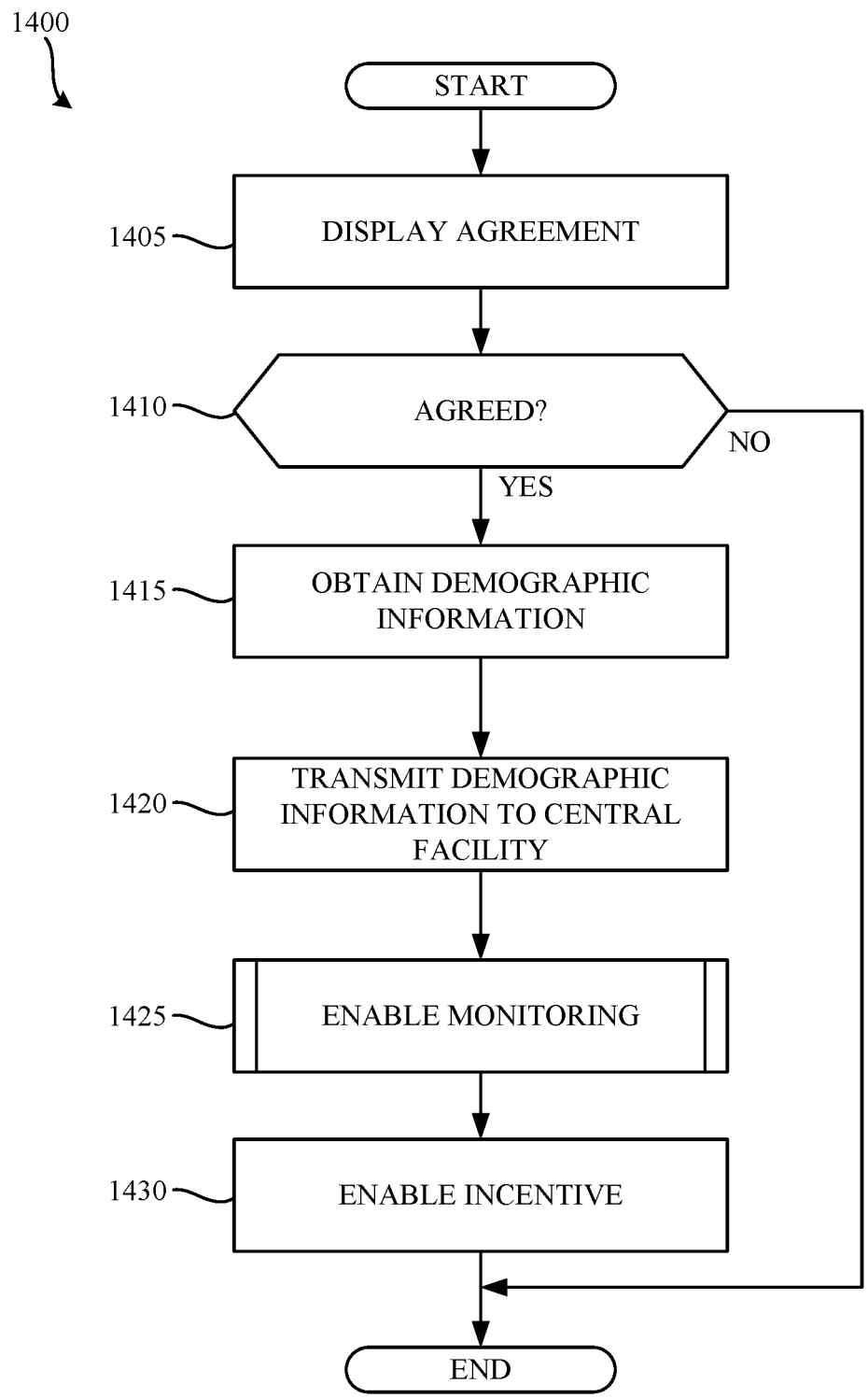
FIG. 14 is a flowchart representative of example machine-readable instructions which may be executed to implement the example meter of FIG. 3 to obtain permission to enable monitoring.

FIG. 14 is a flowchart 1400 representative of example machine-readable instructions which may be executed to implement the example meter of FIG. 3 to obtain permission to enable monitoring. The example process 1400 of FIG. 14 begins when the media device (e.g., the media device 205) is powered on. The overlay controller 320 then presents an agreement via the display of the media device informing the user that monitoring may be enabled with their permission (block 1405). The registration data receiver 350 receives user input to determine whether the user has agreed to the agreement (block 1410). In the illustrated example, user input is received via the control receiver 245. If the user does not agree to monitoring, monitoring is not enabled and the example process 1400 of FIG. 14 terminates.

If the user does agree to monitoring, the registration data receiver 350 obtains demographic information from the user (block 1415). In the illustrated example, the registration data receiver 350 obtains the demographic information via the control receiver 245. After the user has agreed to be monitored, they may be referred to as a panelist. In the illustrated example, the demographic information includes, but is not limited to, a geographic location of the panelist, and age of the panelist, an income level of the panelist, etc. Such demographic information enables extrapolation and/or projection of media viewing habits to population(s) of interest.

The network communicator 370 transmits the demographic information to the central facility 275 (block 1420). In the illustrated example, the network communicator 370 transmits the demographic information using an Internet connection. However, the demographic information may be transmitted in any other fashion. For example, the demographic information may be stored (e.g., cached, buffered, etc.) in the data store 360 and transmitted to the central facility 275 at a different time. The registration data receiver 350 then enables monitoring (block 1425) by, for example, enabling the logging data receiver 310 and/or the media identifier 330. The logging data receiver 310 and/or the media identifier 330 then proceed to monitor media presentations. In some examples, the registration data receiver communicates the permission granted by the user to other media devices so that respective monitors of the other media devices may also be enabled. In the illustrated example, the data controller 365 enables an incentive to be issued to the panelist (block 1430). In the illustrated example, the example data controller 365 sends a notification to the central facility 275 that monitoring has been enabled, thereby enabling the monitoring entity to provide the incentive. In the illustrated example, the incentive is a credit towards a cable television bill. However, any other incentive may additionally or alternatively be used.

Figure 15:
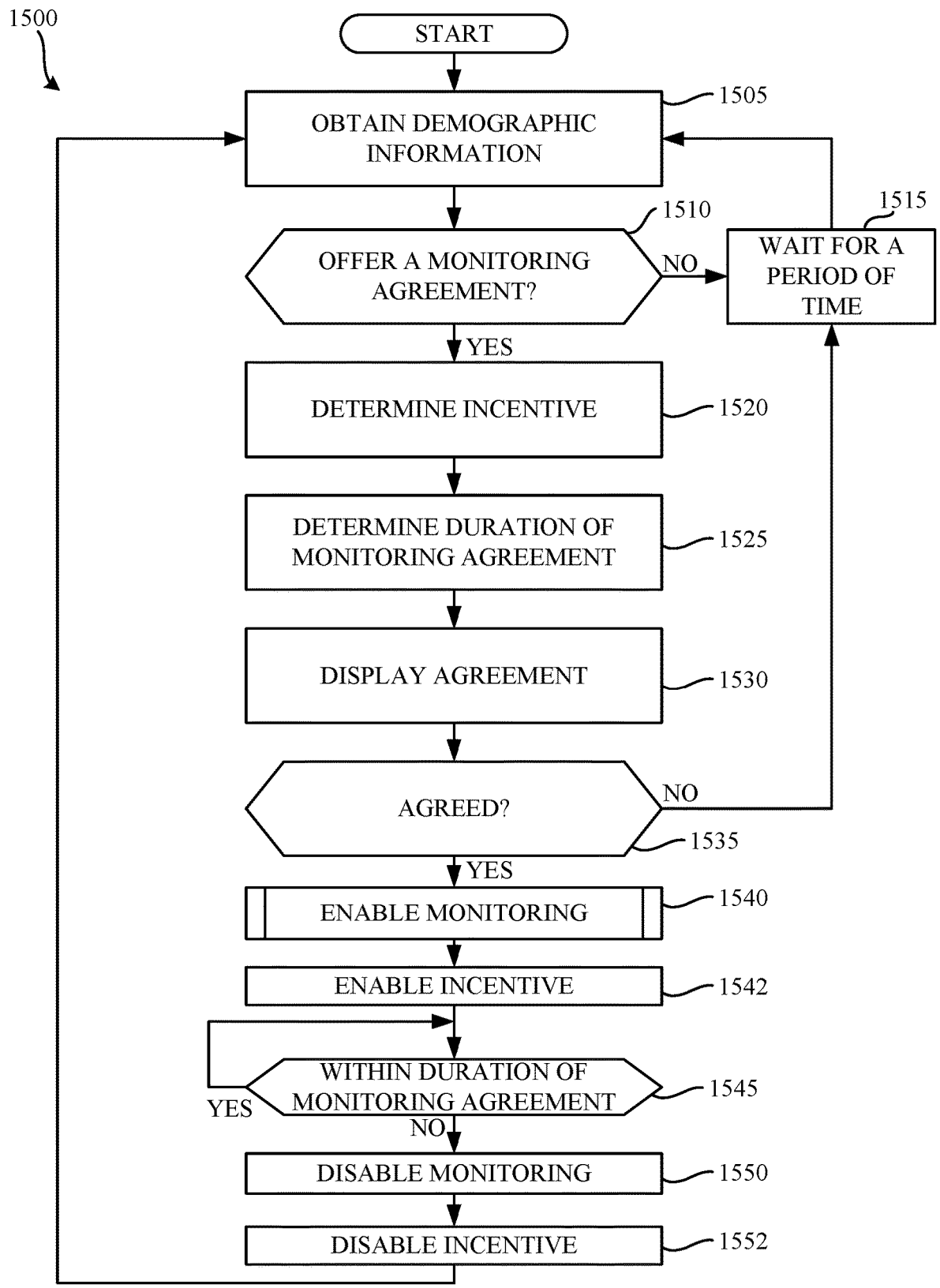
FIG. 15 is a flowchart representative of example machine-readable instructions which may be executed to implement the example meter of FIG. 3 to offer a monitoring agreement in exchange for permission to enable monitoring.

FIG. 15 is a flowchart 1500 representative of example machine-readable instructions which may be executed to implement the example meter of FIG. 3 to offer a monitoring agreement in exchange for permission to enable monitoring. The example process 1500 FIG. 15 begins when the media device (e.g., the media device 205) is powered on. The registration data receiver 350, in conjunction with the overlay controller 320, obtains demographic information from a user (block 1505). In the illustrated example of FIG. 15, demographic information is obtained prior to the user agreeing to become a panelist. This is useful because, for example, it enables the monitoring entity to determine whether they would offer a monitoring agreement to the user based on the demographic information. The example registration data receiver 350 determines whether to offer a monitoring agreement to the user (block 1510). In some examples, the registration data receiver 350 communicates with the central facility 275 via the network communicator 370 to determine whether a monitoring agreement should be offered. In the illustrated example, the registration data receiver 350 and/or the central facility 275 determines whether to offer the monitoring agreement based on whether other users having similar demographic characteristics are already monitored. For example, if the central facility 275 already receives a large amount of data from users having a similar demographic, additional data from users having the same demographic may be of lower value when compared to users having a different demographic. Such information may additionally or alternatively be used to determine incentives offered to the panelist.

If the monitoring agreement is not to be offered, the registration data receiver 350 waits for a period of time (block 1515) before obtaining updated demographic information (block 1505). In the illustrated example, the registration data receiver 350 waits for a period of one month before asking the user for updated demographic information. However, any other duration may additionally or alternatively be used. In the illustrated example, the registration data receiver 350 waits for one month so as to not repetitively asked the user for updated demographic information. In some examples, the registration data receiver 350 asks the user to confirm that the previous demographic information is still correct.

If the example registration data receiver 350 determines that the monitoring agreement is to be offered (block 1510), the example registration data receiver 350 determines an incentive to be offered in connection with the monitoring agreement (block 1520). In the illustrated example, the incentive is a credit towards a cable television bill. However, any other incentive may additionally or alternatively be used such as, for example, gift cards, cash, goods, services, etc. In some examples, the incentive offered may be based on the level of monitoring proposed in the monitoring agreement. For example, a higher incentive may be offered when the monitoring agreement includes permission to identify users within an audience (e.g., via an imaging device such as the image sensor 530 of FIG. 5). The registration data receiver 350 then determines a duration of the monitoring agreement to be offered block 1525. In the illustrated example, the duration of the monitoring agreement is three months. However, any other duration may additionally or alternatively be used. In the illustrated example, the duration of the monitoring agreement corresponds to the offered incentive. For example, a larger incentive maybe offered for monitoring over a longer time period.

The example overlay controller 320 displays the agreement via the media device 205 (block 1530). If the user does not agree to the monitoring agreement, the registration data receiver 350 proceeds to wait for a period of time (block 1515) before determining whether the demographic information remains correct (block 1505), and whether a monitoring agreement is to be offered (block 1510).

If the user agrees to the monitoring agreement (block 1535), the registration data receiver 350 enables monitoring (block 1540) by, for example, enabling the logging data receiver 310 and/or the media identifier 330. The logging data receiver 310 and/or the media identifier 330 then proceed to monitor media presentations. In the illustrated example, the data controller 365 enables an incentive to be issued to the panelist (block 1540). In the illustrated example, the example data controller 365 sends a notification to the central facility 275 that monitoring has been enabled, thereby enabling the monitoring entity to provide the incentive. In the illustrated example, the incentive is a credit towards a cable television bill. However, any other incentive may additionally or alternatively be used. In the illustrated example of FIG. 15, the incentive is time-limited based on the duration of the monitoring agreement. For example, once the monitoring agreement reaches its termination, the incentive is also terminated.

The registration data receiver 350 periodically and/or aperiodically determines whether the duration of the monitoring agreement has expired (block 1545). In the illustrated example, the registration data receiver 350 makes the determination once a day. However, any other timing for making such a determination may additionally or alternatively be used such as, for example, making the determination upon adding a record to the data store 360, making the determination after data is transmitted to the central facility 275, etc. If the monitoring agreement has not expired, no changes are made and the registration data receiver 350 periodically and/or aperiodically re-checks to determine whether the monitoring agreement has expired. If the monitoring agreement has expired, the registration data receiver 350 disables monitoring (block 1550) by disabling the logging data receiver 310 and/or the media identifier 330. The example data controller 365 then disables the incentive (block 1552). In the illustrated example, the data controller 365 sends a notification to the central facility 275 that the incentive has been disabled. However, the incentive may be disabled in any other fashion. For example, the incentive may be automatically disabled by the central facility 275 after the monitoring period has expired. Once the monitoring agreement has expired (block 1550) and the incentive has been disabled (block 1552), the registration data receiver 350 determines, whether an additional monitoring agreement should be offered (blocks 1505 and 1510).

Monitor Interacts with Functionality of the Media Device

In the examples disclosed herein, the monitor 270 receives logging information from the logging interface 247 of the media device 205, 405, and/or 505. In some examples, the monitor 270 receives data from additional components of the media device 205, 405, and/or 505 such as, for example, the control receiver 245, the audio output 255, the video output 257, etc. The example monitor 270 processes the received information and stores the information in the data store 360 in a log such as for example, the logs 1000, 1100, 1200, and/or 1300 of FIGS. 10, 11, 12, and/or 13.

Figure 16:
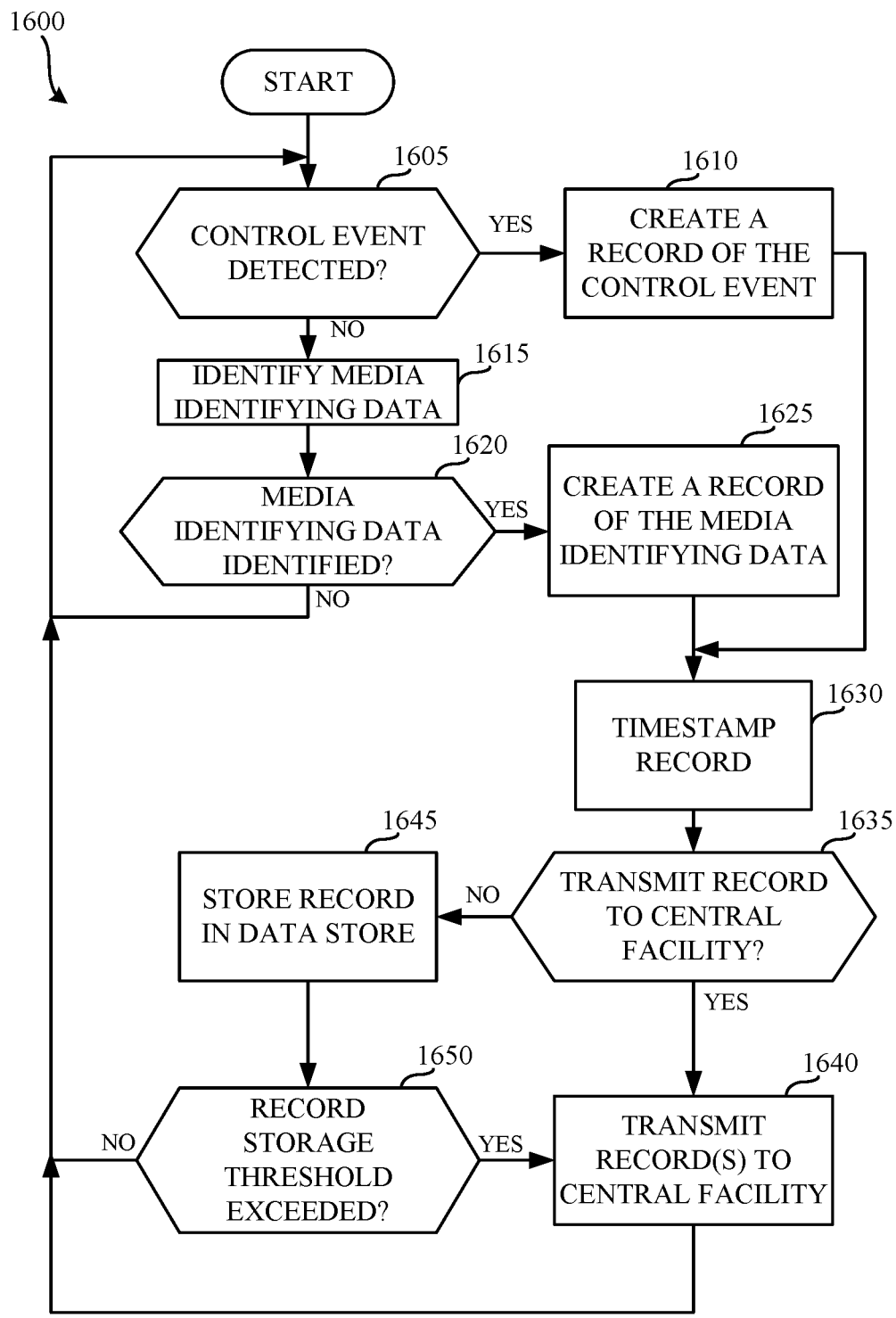
FIG. 16 is a flowchart representative of example machine-readable instructions which may be executed to implement the example meter of FIG. 3 to create a log of monitoring data.

FIG. 16 is a flowchart representative of example machine-readable instructions which may be executed to implement the example meter of FIG. 3 to create a log of monitoring data. The example process 1600 of FIG. 16 begins when the logging data receiver 310 and/or the media identifier 330 are enabled (e.g., blocks 1425 and/or 1540). In the illustrated example, the logging data receiver 310 determines if a control event is received from the logging interface 247 (block 1605). The control event may be, for example, a control notification from the logging interface 247 indicating that the control processor 240 has issued a command. The control notification may include for example, an indication that the control processor 240 has instructed the switch 250 to change selected inputs, an indication that the control processor 240 has instructed the tuner 220 to tune to a different channel, an indication that the control processor 240 as instructed the media application 230 to stream media, etc. If the control event is detected (block 1605), the logging data receiver 310 creates a record of the control event (block 1610). If the control event is not detected (block 1605), the media identifier 330 attempts to determine media-identifying data associated with presented media (e.g., a code, a signature, metadata derived from a code and/or a signature). The media identifier 330 determines if the media-identifying data is identified (block 1620). If the media-identifying data is not identified, the logging data receiver 310 continues to wait for data from the logging interface 247 (block 1605). If the media-identifying data is identified, the media identifier 330 creates a record of the media identifying data (block 1625). In the illustrated example, the media identifier 330 creates a record including the media identifying data. However, in some examples, the media identifier 330 creates a record that is based on the media identifying data.

The timestamper 340 then timestamps the record created by the logging data receiver 310 (block 1610) and/or the media identifier 330 (block 1625). Timestamping (e.g., recording a time that an event occurred) enables accurate identification and/or correlation of media that was presented and/or the time that it was presented with the user(s) of the media device.

The example data controller 365 determines whether the record should be transmitted to the central facility 275 (block 1635). In some examples, records are streamed to the central facility as they are identified and/or created. If the example data controller 365 is to transmit the record to the central facility (block 1635), the network communicator 370 transmits the record to the central facility 275 (block 1640). In some examples, records are stored in the data store 360 so that they may be transmitted in a single transmission (e.g., a single HTTP request, a single file transfer protocol (FTP) command, etc.). If the example network communicator is not to transmit the record to the central facility 275 (block 1635), the record is stored in the data store 360 by the data controller 365 (block 1645).

The data controller 365 determines whether a storage threshold of the data store 360 has been met or exceeded (block 1650). In the illustrated example, the threshold represents an amount of time that records may be stored in the data store 360 before being transmitted to the central facility 275. Records may be stored for, for example, one hour, one day, one week, one month, etc. However, any other type of threshold may additionally or alternatively be used such as, for example, a storage limit (e.g., 1 kB, 64 kB, 1 MB, etc.). If the storage threshold is exceeded, the network communicator 370 transmits the stored records to the central facility 275 (block 1640). If the storage threshold is not exceeded, the logging data receiver 310 continues to wait for control events from the logging interface 247 (block 1605).

While in the illustrated example, a storage threshold is used to determine when to transmit monitoring information, any other way of making such a determination may additionally or alternatively be used. For example, monitoring information may be transmitted to the central facility 275 at a fixed interval (e.g., 30 minutes, 3 hours, 1 day, 1 week, etc.), monitoring information may be transmitted in response to an external event (e.g., user pushes a synchronize button, the central facility 275 requests updated monitoring information, etc.).

Figure 17:
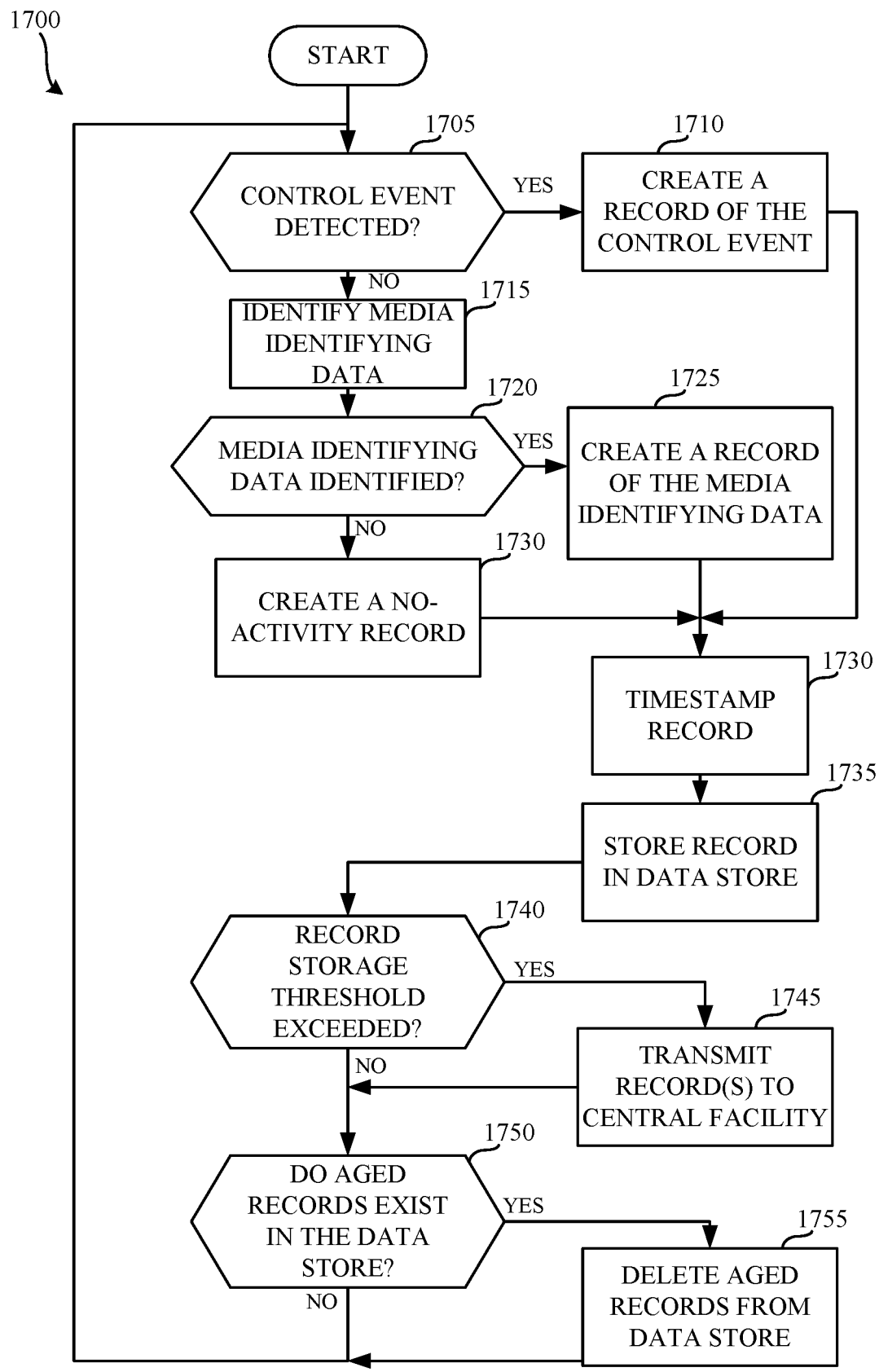
FIG. 17 is a flowchart representative of example machine-readable instructions which may be executed to implement the example meter of FIG. 3 to create a log of monitoring data.

FIG. 17 is a flowchart representative of example machine-readable instructions which may be executed to implement the example meter of FIG. 3 to create a log of monitoring data. In the illustrated example, the logging data receiver 310 determines if a control event is received from the logging interface 247 (block 1705). The control event may be, for example, a control notification from the logging interface 247 indicating that the control processor 240 has issued a command. The control notification may include for example, an indication that the control processor 240 has instructed the switch 250 to change a selected input, an indication that the control processor 240 has instructed the tuner 220 to tune to a different channel, an indication that the control processor 240 as instructed the media application 230 to stream media, etc.

If the control event is detected (block 1705), the logging data receiver 310 creates a record of the control event (block 1710). If the control event is not detected (block 1705), the media identifier 330 attempts to determine media-identifying data associated with presented media (e.g., a code, a signature, metadata derived from a code and/or a signature). The media identifier 330 determines if the media-identifying data is identified (block 1720). If the media-identifying data is not identified, the logging data receiver 310 creates a no-activity record (block 1725). No-activity records are useful because they indicate that the monitor 270 was active, but that no activity was occurring at the time the record was created. If the media-identifying data is identified, the media identifier 330 creates a record of the media-identifying data (block 1725). In the illustrated example, the media identifier 330 creates a record including the media-identifying data. However, in some examples, the media identifier 330 creates a record that is based on the media identifying data.

The timestamper 340 then timestamps the record created by the logging data receiver 310 (blocks 1710 and/or 1730) and/or the media identifier 330 (block 1675). Timestamping (e.g., recording a time that an event occurred) enables accurate identification and/or correlation of media that was presented and/or the time that it was presented with the user(s) of the media device.

The timestamped record is stored in the data store 360 (block 1735). The data controller 365 then determines whether a storage threshold of the data store 360 has been met or exceeded (block 1740). In the illustrated example, the threshold represents an amount of time that records may be stored in the data store 360 before being transmitted to the central facility 275. However, any other type of threshold may additionally or alternatively be used. If the storage threshold is exceeded, the network communicator 370 transmits the store records to the central facility 275 (block 1745). If storage threshold is not exceeded, the data controller 365 determines whether aged records exist in the data store (block 1750). Aged records may include, for example, records that are associated with a time period older than a threshold (e.g., ninety days, one year, etc.), records that are no longer associated with the same panelist (e.g., a media device may have been returned and/or sold while monitoring data was stored thereon), etc. If aged records are detected (block 1750), the data controller 365 deletes the aged records from the data store (block 1755). The logging data receiver 310 then continues to wait for control events from the logging interface 247 (block 1705).

Monitor Interacts with Functionality of the Media Device

In examples disclosed herein, the monitor 270 may interact with functionality of the media device (e.g., the media device 205, 405, and/or 505). Such interaction may be useful for identifying users present for a media presentation (e.g., is a particular person in the audience). In some examples, the monitor 270 interacts with inputs and/or sensors of auxiliary media devices (e.g., a Microsoft Kinect®) for enhanced monitoring capability. For example, the audio sensor 510, the infrared sensor 520, and/or the image sensor 530 may be used to, for example, identify a person in the audience, receive feedback to an overlay presented by the overlay controller 320, etc. In some examples, the identified users are used to correlate which users are present in the audience to which media is presented. However, identifying which users are present enables other functionality as well. For example, if an R rated movie is presented and a user identified to be a child enters the audience, an overlay may be presented to prevent the child from viewing the R rated movie.

Figure 18:
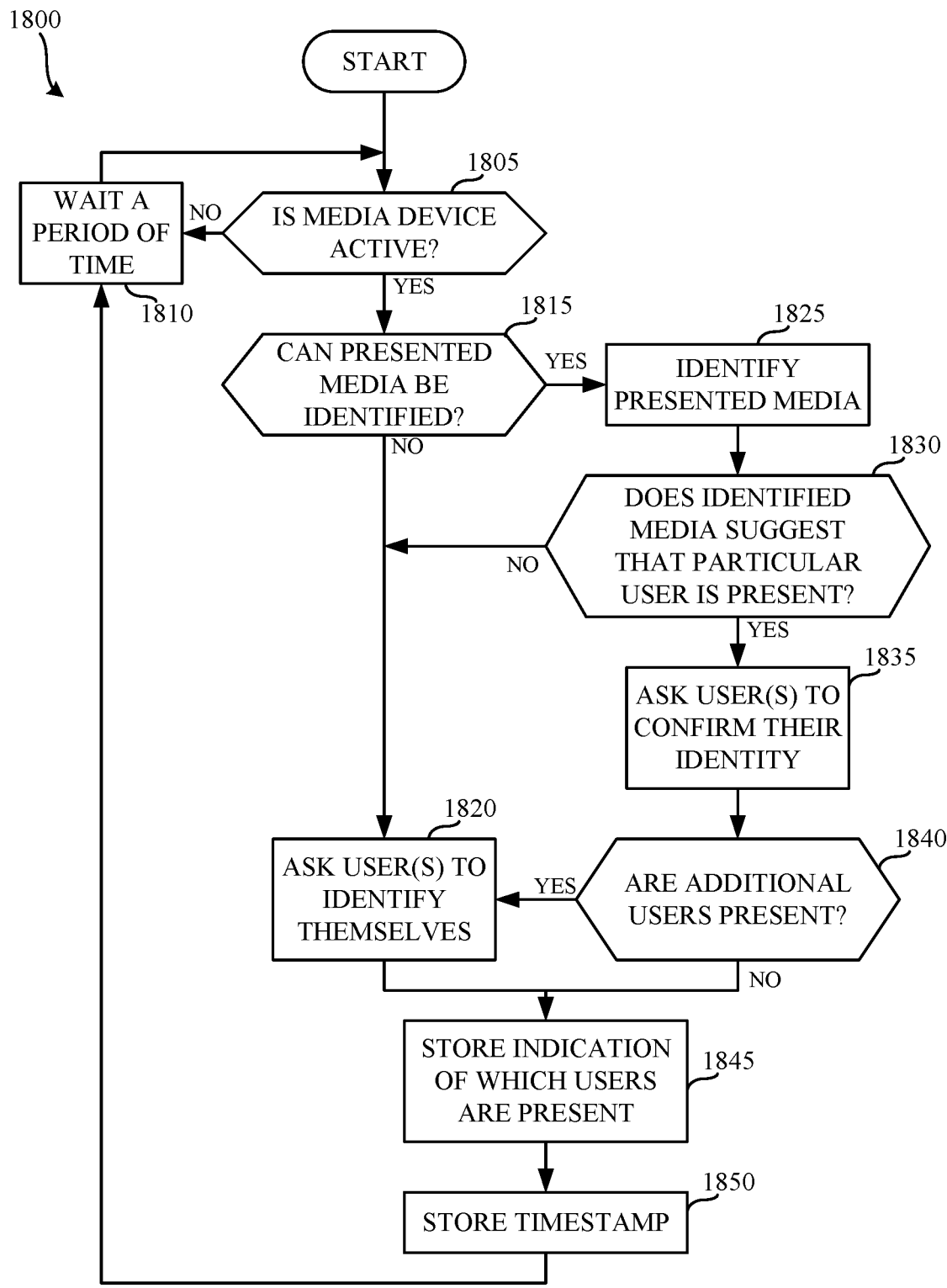
FIG. 18 is a flowchart representative of example machine-readable instructions which may be executed to implement the example meter of FIG. 3 to identify users present for a media presentation.

FIG. 18 is a flowchart representative of example machine-readable instructions which may be executed to implement the example meter of FIG. 3 to identify users present for a media presentation. The example process 1800 of the illustrated example of FIG. 18 begins when the logging data receiver 310 and/or the media identifier 330 are enabled. The logging data receiver 310 determines if the media device (e.g., the media device 205, 405, and/or 505) is active (block 1805). The media device may be determined to be active when, for example, it is presenting media, it is powered on, etc. If the media device is not active, the logging data receiver 310 proceeds to wait for a period of time (block 1810). If the media device is active, the media identifier 330 determines whether presented media can be identified (block 1815). If the media can be identified, the media identifier 330 identifies the presented media (block 1825). The media identifier then determines whether the identified media suggests that a particular user is present (block 1830). For example, if it is determined that a particular user has an affinity for a particular show, detecting the show may also indicate that the particular user is present.

If the identified media suggests that a particular user is present (block 1830), the overly controller 320 presents an overlay the of the media device asking the user to confirm their identity (block 1835). The logging data receiver 310 then determines based on a sensor input whether additional uses are present (block 1840). For example, if an image sensor (e.g., the image sensor 530 and/or the infrared sensor 520 of FIG. 5) indicates that multiple users are present in the audience, it may be advantageous to ask those users to identify themselves. If additional users are present (block 1840) and/or if the presented media cannot be identified (block 1815), the users are asked to identify themselves. In the illustrated example, users are asked identify themselves via an overlay presented by the overlay controller 320. User responses to the overlay may be received by the logging data receiver 310 based on control inputs received by the media device (e.g., a user presses a button on a remote control, a user raises their arm, etc.) the data controller 365 then stores a record indicating which users are present (block 1845).

In the illustrated example, a single record is stored referencing each of the users present (e.g., one record is stored indicating that Mike, Bob, and Cheryl are present). However, in some examples, multiple records may be stored each referencing a single user (e.g., a first record indicating that Mike is present is stored, a second record indicating that Bob is present, and a third record indicating that Cheryl is present). The timestamper 340 stores a timestamp in association with the record (block 1850). Storing a timestamp in association with a record of the identified user(s) is useful because it enables correlation of which media was presented with which user(s) were present. The logging data receiver 310 then waits a period of time (block 1810) before attempting to identify additional users.

Figure 19:
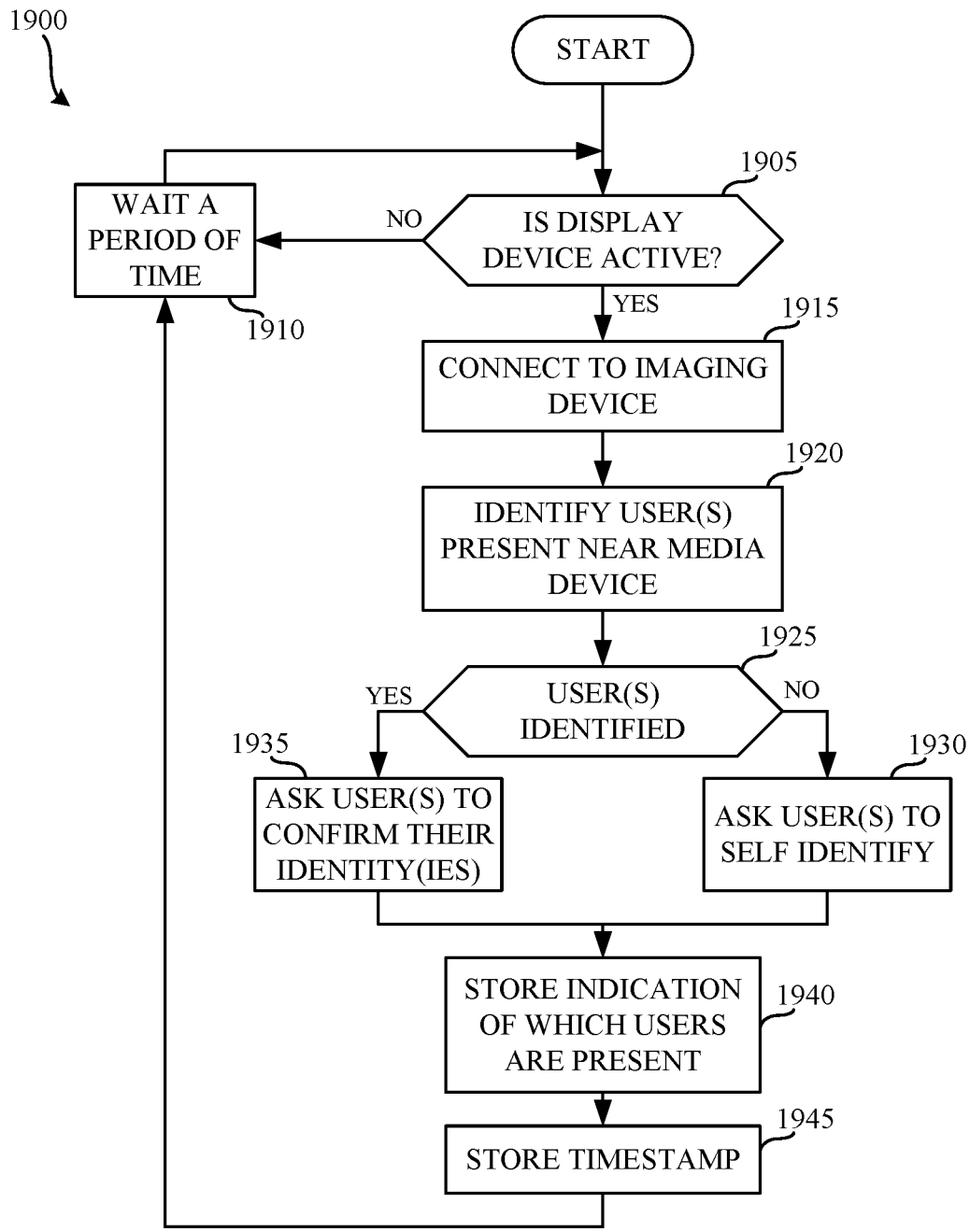
FIG. 19 is a flowchart representative of example machine-readable instructions which may be executed to implement the example meter of FIG. 3 to identify users present for a media presentation using an imaging device.

FIG. 19 is a flowchart representative of example machine-readable instructions which may be executed to implement the example meter of FIG. 3 to identify users present for a media presentation using an imaging device. The example process 1900 of the illustrated example of FIG. 19 begins when the logging data receiver 310 and/or the media identifier 330 are enabled. The logging data receiver 310 determines if the media device (e.g., the media device 205, 405, and/or 505) is active (block 1905). If the media device is not active, the logging data receiver 310 proceeds to wait for a period of (time 1910). If the media device is active, the logging data receiver 310 connects to an imaging device (e.g., an image sensor) of the media device (block 1915). The logging data receiver 310, in connection with the positioning processor 540 of the illustrated example of FIG. 5 identifies user(s) present near the media device. For example, the Microsoft Kinect® sensor may be used to identify users present near the media device. If users are identified by the logging data receiver 310 (block 1915), the overlay controller 320 presents an overlay asking the user(s) to confirm their identities (block 1935). Asking the user(s) to confirm their identities enhances data integrity. However, in some examples, the users may not be asked to confirm their identifies if the recognition capability of the imaging device (e.g., a Microsoft Kinect®) is sufficient to ensure data integrity.

If users are not identified by the logging data receiver 310 (block 1915), the overlay controller 320 presents an overlay asking users to self-identify. User responses to the overlay may be received by the logging data receiver 310 based on control inputs received by the media device (e.g., a user presses a button on a remote control, a user raises their arm, etc.) the data controller 365 then stores a record indicating which users are present (block 1940). In the illustrated example, a single record is stored referencing each of the users present. However, in some examples, multiple records may be stored each referencing a single user. The timestamper 340 stores a timestamp in association with the record (block 1945). Storing a timestamp in association with a record of the identified users is useful because it enables correlation of which media was presented with which users were present. The logging data receiver 310 then waits a period of time (block 1910) before attempting to identify additional users.

Figure 20:
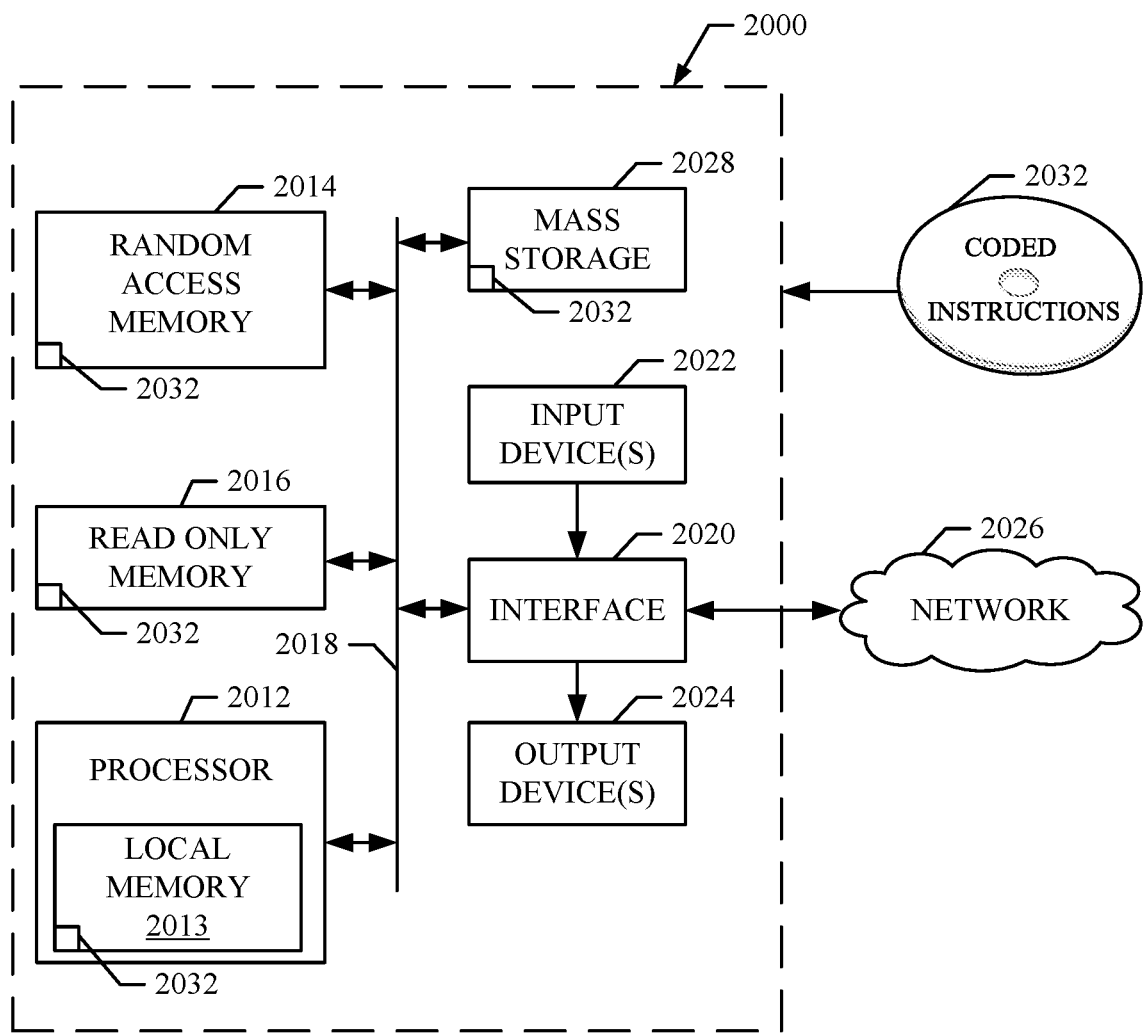
FIG. 20 is a block diagram of an example processor platform capable of executing the example machine-readable instructions of FIGS. 14, 15, 16, 17, 18, and/or 19 to implement the example meter of FIG. 3.

FIG. 20 is a block diagram of an example processor platform 2000 capable of executing the instructions of FIGS. 14, 15, 16, 17, 18, and/or 19 to implement the monitor 270 of FIG. 3. The processor platform 2000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 2000 of the illustrated example includes a processor 2012. The processor 2012 of the illustrated example is hardware. For example, the processor 2012 can be implemented by one or more integrated circuits, logic circuits, microprocessors, or controllers from any desired family or manufacturer.

The processor 2012 of the illustrated example includes a local memory 2013 (e.g., a cache). The processor 2012 of the illustrated example is in communication with a main memory including a volatile memory 2014 and a non-volatile memory 2016 via a bus 2018. The volatile memory 2014 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2016 may be implemented by flash memory and/or any other desired type of memory device. Access to the main memory 2014, 2016 is controlled by a memory controller.

The processor platform 2000 of the illustrated example also includes an interface circuit 2020. The interface circuit 2020 may be implemented by any type of interface standard, such as an Ethernet interface, a universal serial bus (USB), and/or a PCI express interface.

In the illustrated example, one or more input devices 2022 are connected to the interface circuit 2020. The input device(s) 2022 permit a user to enter data and commands into the processor 2012. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 2024 are also connected to the interface circuit 2020 of the illustrated example. The output devices 2024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 2020 of the illustrated example, thus, typically includes a graphics driver card.

The interface circuit 2020 of the illustrated example also includes a communication device such as a transmitter, a receiver, a transceiver, a modem and/or network interface card to facilitate exchange of data with external machines (e.g., computing devices of any kind) via a network 2026 (e.g., an Ethernet connection, a digital subscriber line (DSL), a telephone line, coaxial cable, a cellular telephone system, etc.).

The processor platform 2000 of the illustrated example also includes one or more mass storage devices 2028 for storing software and/or data. Examples of such mass storage devices 2028 include floppy disk drives, hard drive disks, compact disk drives, Blu-ray disk drives, RAID systems, and digital versatile disk (DVD) drives.

The coded instructions 2032 of FIGS. 14, 15, 16, 17, 18, and/or 19 may be stored in the mass storage device 2028, in the volatile memory 2014, in the non-volatile memory 2016, and/or on a removable tangible computer readable storage medium such as a CD or DVD.

Although certain example methods, apparatus, and articles of manufacture have been described herein, the scope of coverage of this patent is not limited thereto. On the contrary, this patent covers all methods, apparatus, and articles of manufacture fairly falling within the scope of the claims of this patent.

We claim:

1. A non-transitory computer readable medium comprising computer readable instructions that, when executed, cause a processor of a media device to at least:
   determine an amount of an incentive to be offered to a user of the media device, the amount of the incentive based on a level of monitoring to be performed by monitor software, the level of monitoring including authorization to determine the user is an audience member of the media device via an imaging device;
   present, via a display of the media device, information to indicate that the monitor software in the media device can be enabled and the amount of the incentive, the monitor software to monitor media presented by the media device, the monitor software to be disabled by default;
   detect a first user input, the first user input to authorize the monitor software in the media device to be enabled; and
   in response to detection of the first user input:
      enable the monitor software in the media device to generate and report at least one of video fingerprints, audio fingerprints, video watermarks or audio watermarks representative of media presented by the media device;
      transmit, via a network interface, a first notification to a remote monitoring entity to indicate that the monitor software in the media device has been enabled; and
      transmit, via the network interface, a second notification to the remote monitoring entity, the second notification to enable issuance of the incentive.

2. The computer readable medium of claim 1, wherein the instructions, when executed, cause the processor to present the information indicating that the monitor software in the media device can be enabled in response to the media device being powered on.

3. The computer readable medium of claim 1, wherein the media device is a smart television.

4. The computer readable medium of claim 1, wherein the first user input is to authorize the monitor software in the media device to be enabled for a duration, the amount of the incentive is based on the duration.

5. A media device comprising:
   a display;
   a control receiver to receive infrared input commands;
   a network interface;
   memory including machine readable instructions; and
   processor circuitry to execute the machine readable instructions to at least:
      determine an amount of an incentive to be offered to a user of the media device, the amount of the incentive is based on a level of monitoring to be performed by monitor software, the level of monitoring including authorization to determine the user is an audience member of the media device via an imaging device;
      present, via the display, information to indicate that monitor software in the media device can be enabled and the amount of the incentive, the monitor software to monitor media presented by the media device, the monitor software to be disabled by default;
      detect a first user input received via the control receiver, the first user input to authorize the monitor software in the media device to be enabled; and
      in response to detection of the first user input:
         enable the monitor software in the media device to generate and report at least one of video fingerprints, audio fingerprints, video watermarks or audio watermarks representative of media presented by the media device;
         transmit, via the network interface, a first notification to a remote monitoring entity to indicate that the monitor software in the media device has been enabled; and
         transmit, via the network interface, a second notification to the remote monitoring entity, the second notification to enable issuance of the incentive.

6. The media device of claim 5, wherein the processor circuitry is to present the information indicating that the monitor software in the media device can be enabled in response to the media device being powered on.

7. The media device of claim 5, wherein the media device is a smart television.

8. The media device of claim 5, wherein the first user input authorizes the monitor software in the media device to be enabled for a duration, the amount of the incentive is based on the duration.

9. A method comprising:
   determining, by executing an instruction with a processor of a media device, an amount of an incentive to be offered to a user of a media device, the amount of the incentive is based on a level of monitoring to be performed by monitor software, the level of monitoring including authorization to determine the user is an audience member of the media device via an imaging device;
   presenting, by executing an instruction with the processor, information via a display of the media device and the amount of the incentive, the information indicating that monitor software in the media device can be enabled, the monitor software to monitor media presented by the media device, the monitor software to be disabled by default;
   detecting, by executing an instruction with the processor, a first user input, the first user input to authorize the monitor software in the media device to be enabled; and
   in response to detection of the first user input:
      enabling, by executing an instruction with the processor, the monitor software in the media device to generate and report at least one of video fingerprints, audio fingerprints, video watermarks or audio watermarks representative of media presented by the media device;
      transmitting, via a network interface, a first notification to a remote monitoring entity to indicate that the monitor software in the media device has been enabled; and transmit, via the network interface, a second notification to the remote monitoring entity, the second notification to enable issuance of the incentive.

10. The method of claim 9, wherein the information indicating that the monitor software in the media device can be enabled is presented in response to the media device being powered on.

11. The method of claim 9, wherein the media device is a smart television.

12. The method of claim 9, wherein the first user input authorizes the monitor software in the media device to be enabled for a duration, the amount of the incentive is based on the duration.

* * * * *